US011026250B2

United States Patent
Shi et al.

(10) Patent No.: US 11,026,250 B2
(45) Date of Patent: Jun. 1, 2021

(54) SCHEDULING METHOD, DEVICE, AND SYSTEM

(71) Applicant: HUAWEI TECHNOLOGIES CO., LTD., Shenzhen (CN)

(72) Inventors: Jie Shi, Shenzhen (CN); Chao Li, Beijing (CN); Xingwei Zhang, Beijing (CN); Yinghua Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 197 days.

(21) Appl. No.: 16/188,303

(22) Filed: Nov. 13, 2018

(65) Prior Publication Data
US 2019/0082454 A1 Mar. 14, 2019

Related U.S. Application Data

(63) Continuation of application No. PCT/CN2016/082132, filed on May 13, 2016.

(51) Int. Cl.
*H04W 72/12* (2009.01)
*H04W 72/04* (2009.01)
(Continued)

(52) U.S. Cl.
CPC ......... *H04W 72/1278* (2013.01); *H04W 4/40* (2018.02); *H04W 72/0406* (2013.01); *H04W 72/0413* (2013.01); *H04W 76/14* (2018.02)

(58) Field of Classification Search
None
See application file for complete search history.

(56) References Cited

U.S. PATENT DOCUMENTS

2011/0305210 A1 12/2011 Wu
2013/0301582 A1 11/2013 Jiang et al.
(Continued)

FOREIGN PATENT DOCUMENTS

CN 101651862 A 2/2010
CN 102158932 A 8/2011
(Continued)

OTHER PUBLICATIONS

LG Electronics Inc, "TP on UL SPS agreements and other agreements" [online], 3GPP TSG-RAN WG2#94 R2-164358, Apr. 11, 2016, 7 pages.
SA2, "Response LS on CIoT optimization for non-NB-IoT UEs" [online], 3GPP TSG-RAN WG2#93bis R2-162122, Apr. 11, 2016, 2 pages.
(Continued)

*Primary Examiner* — Kodzovi Acolatse
(74) *Attorney, Agent, or Firm* — Kilpatrick Townsend & Stockton LLP

(57) ABSTRACT

The present invention relates to the wireless communications field, and provides a scheduling method, a device, and a system, to resolve a problem that a scheduling resource is wasted when SPS transmission with a relatively short scheduling interval is applied to a V2X service. The scheduling method provided in the present invention includes: receiving, by a first device, semi-persistent scheduling SPS configuration information from a second device; receiving, by the first device, SPS activation information from the second device, where the SPS activation information is used to indicate an activated SPS resource; and sending, by the first device, the SPS instruction information to the second device, where the SPS instruction information is used to instruct to use or not to use a scheduling resource of the activated SPS resource. Embodiments of the present invention are applied to V2X communication.

8 Claims, 22 Drawing Sheets

(51) Int. Cl.
H04W 4/40 (2018.01)
H04W 76/14 (2018.01)

(56) References Cited

U.S. PATENT DOCUMENTS

| | | | |
|---|---|---|---|
| 2016/0212651 A1 | 7/2016 | Zhi et al. | |
| 2017/0332358 A1* | 11/2017 | Park | H04W 72/042 |
| 2019/0014563 A1* | 1/2019 | Lee | H04W 4/40 |
| 2019/0045507 A1 | 2/2019 | Sorrentino et al. | |
| 2019/0116490 A1* | 4/2019 | Chang | H04W 76/27 |

FOREIGN PATENT DOCUMENTS

| | | | |
|---|---|---|---|
| CN | 102158973 A | 8/2011 | |
| CN | 102595600 A | 7/2012 | |
| CN | 102595626 A | 7/2012 | |
| CN | 103313301 A | 9/2013 | |
| CN | 103763784 A | 4/2014 | |
| CN | 103813375 A | 5/2014 | |
| CN | 109076590 A | 12/2018 | |
| EP | 2827634 A1 | 1/2015 | |
| WO | 2012083890 A1 | 6/2012 | |
| WO | 2013132327 A1 | 9/2013 | |
| WO | WO-2013169173 A1 * | 11/2013 | H04W 76/28 |
| WO | 2017135881 A1 | 8/2017 | |

OTHER PUBLICATIONS

Catt: "PDCCH missing issue in skipping UL transmission", 3GPP Draft; R2-154121—Skip UL Transmission—V1, vol. RAN WG2, no. Malmo, Sweden; Oct. 5, 2015-Oct. 9, 2015 Oct. 4, 2015, XP051004721, 5 pages.

Ericsson: "Other Uu Enhancements for V2X",3GPP Draft; R2-162816, vol. RAN WG2, no. Dubrovnik, Croatia; Apr. 11, 2016-Apr. 15, 2016, Apr. 2, 2016, XP051082570, 4 pages.

Ericsson: "Sidelink Resource Allocation in V2X", 3GPP Draft; R2-162818, vol. RAN WG2, no. Dubrovnik, Croatia; Apr. 11, 2016-Apr. 15, 2016, Apr. 2, 2016, XP051082572, 6 pages.

Ericsson, Discussion on Uu Enhancements for V2X. 3GPP TSG-RAN WG2#93 Malta, Feb. 15-19, 2016, R2-161565, 8 pages.

"3GPP TS 36.331 V13.1.0 (Mar. 2016), 3rd Generation Partnership Project;Technical Specification Group Radio Access Network;Evolved Universal Terrestrial Radio Access (E-UTRA);Radio Resource Control (RRC);Protocol specification (Release 13)", 551 pages.

"3GPP TS 36.213 V13.1.1 (Mar. 2016), 3rd Generation Partnership Project;Technical Specification Group Radio Access Network;Evolved Universal Terrestrial Radio Access (E-UTRA);Physical layer procedures(Release 13)", 361 pages.

Huawei, HiSilicon, SPS enhancement for V2V. 3GPP TSG RAN WG1 Meeting #84bis Busan, Korea, Apr. 11-15, 2016, R1-162122, 6 pages.

* cited by examiner

| 0 | 1 | 2 | 3 |
|---|---|---|---|
| 1 | 0 | 0 | 1 |

FIG. 12

SCHEDULING METHOD, DEVICE, AND SYSTEM

CROSS-REFERENCE TO RELATED APPLICATIONS

This application is a continuation of International Application No. PCT/CN2016/082132, filed on May 13, 2016, the disclosure of which is hereby incorporated by reference in its entirety.

TECHNICAL FIELD

The present invention relates to wireless communications field, and in particular, to a scheduling method, a device, and a system.

BACKGROUND

At present, an LTE network is introduced into Internet of Vehicles communication. A communications node is placed on a vehicle, and this node is used for communication between inside and outside the vehicle. Referring to FIG. 1, vehicle-to-vehicle communication, vehicle-to-network communication, and vehicle-to-pedestrian communication may be specifically included, and herein are collectively referred to as vehicle to X (V2X) communication. During Internet of Vehicles communication, messages sent by a communications node are closely related to operation characteristics of the Internet of Vehicles itself. Some of these messages have a characteristic of periodic sending, for example, broadcasting information such as a speed limit at a fixed bend at regular intervals.

Considering that messages are sent by a node in a specified period, to avoid that downlink control information (DCI) is frequently sent on a physical downlink control channel (PDCCH) to indicate a resource location used when a node sends a message on an uplink resource, some methods are used in the prior art to indicate, in advance, a resource location to be used when a node sends a message on an uplink resource.

For example, an semi-persistent scheduling (SPS) feature is used to allocate or specify an uplink resource by using DCI on a PDCCH, and then a node repeatedly uses a same uplink time-frequency resource periodically to send messages. However, because a V2X service is not absolutely periodic, the node may send data suddenly. Referring to FIG. 2, if an excessively short SPS scheduling interval is set to respond to data sent by a node suddenly, an extra uplink grant resource is wasted.

In addition, a node sends information about a perceived traffic condition to a network side in a form of a V2X message. After receiving the V2X message, the network side needs to know a coverage area of this V2X message, so as to select a proper cell to serve another node in the cell. Referring to FIG. 3, UE 1, serving as a node, sends a perceived traffic condition to an eNB 1 on a network side in a form of a V2X message, and the eNB 1 and an eNB 2 that are on the network side communicate with each other, so that the eNB 2 also knows the traffic condition perceived by the UE 1. In this case, when broadcasting the traffic condition to a served node, the eNB 2 needs to determine that the traffic condition is only useful for UE 2 that is within a measurement coverage area of the UE 1, and should not send the traffic condition to UE 3 that is at a relatively long distance.

SUMMARY

Embodiments of the present invention provide a scheduling method, a device, and a system, to resolve a problem that a scheduling resource is wasted when SPS transmission with a relatively short scheduling interval is applied to a V2X service.

To achieve the foregoing objective, the following technical solutions are used in the embodiments of the present invention.

According to a first aspect, a scheduling method is provided, and the method includes:

receiving, by a first device, semi-persistent scheduling SPS configuration information from a second device, where the SPS configuration information is used to indicate an SPS resource configuration used by the second device;

receiving, by the first device, SPS activation information from the second device, where the SPS activation information is used to indicate an activated SPS resource, and the activated SPS resource is one or more SPS resources in the SPS resource configuration; and sending, by the first device, SPS instruction information to the second device, where the SPS instruction information is used to instruct to use or not to use a scheduling resource of the activated SPS resource.

In the scheduling method provided in the present invention, the first device receives the SPS configuration information from the second device, and sends the SPS instruction information to the second device after receiving the SPS activation information from the second device. The SPS configuration information is used to indicate the SPS resource configuration used by the second device, the SPS activation information is used to indicate the activated SPS resource, the activated SPS resource is the one or more SPS resources in the SPS resource configuration, and the SPS instruction information is used to instruct to use or not to use the scheduling resource of the activated SPS resource. Therefore, in the present invention, the second device may configure different SPS resources for the first device and activate one or more of the SPS resources for the first device, the first device selects, from the one or more of the SPS resources based on the activated SPS resource or resources and a service requirement of a service, an SPS resource that meets the service requirement of the service, and the second device allocates, to another device, an SPS resource that is not used by the first device, so as to maximize scheduling resource utilization. This resolves a problem that a scheduling resource is wasted when SPS transmission with a relatively short scheduling interval is applied to a V2X service.

In a possible design, the SPS resource configuration includes at least one or a combination of the following:

an SPS scheduling interval with m available scheduling resources; or

M SPS scheduling intervals.

In a possible design, when the SPS resource configuration is the SPS scheduling interval with the m available scheduling resources, the method further includes at least one or a combination of the following:

using, by the first device, a UL grant resource, which is determined in a current subframe based on DCI scrambled by using an SPS-CRNTI, as a resource occupied by the m available scheduling resources; or using, by the first device, a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using, by the first device, DCI scrambled by using an SPS-CRNTI, to activate one or more of the m available scheduling resources.

A plurality of scheduling resources in a scheduling interval can be flexibly activated by using this implementation.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

A scheduling resource in the M SPS scheduling intervals can be flexibly activated and deactivated by using this implementation.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In this implementation, the first device can indicate to the second device a scheduling resource that is used or not used.

In a possible design, the time window is sent by the first device to the second device; or the time window is sent by the second device to the first device.

In a possible design, the method further includes:

determining, by the first device, SPS release information, where the SPS release information is used to instruct to release some or all scheduling resources of the activated SPS resource; and sending, by the first device, the SPS release information to the second device.

In this implementation, the first device can instruct to release the some or all scheduling resources of the activated SPS resource.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI is used to instruct to release one or more SPS scheduling intervals of the activated SPS resource.

In a possible design, the method further includes:

Scheduling resources in different SPS resource configurations can be released by using this implementation.

receiving, by the first device, SPS release information from the second device, where the SPS release information is used to instruct to release some or all scheduling resources of the activated SPS resource.

In this implementation, the second device can instruct to release the some or all scheduling resources of the activated SPS resource.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

Scheduling resources in different scheduling intervals of the M SPS scheduling intervals can be released by using this implementation.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

According to a second aspect, a scheduling method is provided, and the method includes:

sending, by a second device, semi-persistent scheduling SPS configuration information to a first device, where the SPS configuration information is used to indicate an SPS resource configuration used by the second device;

sending, by the second device, SPS activation information to the first device, where the SPS activation information is used to indicate an activated SPS resource, and the activated SPS resource is one or more SPS resources in the SPS resource configuration; and receiving, by the second device, SPS instruction information from the first device, where the SPS instruction information is used to instruct to use or not to use a scheduling resource of the activated SPS resource.

In the scheduling method provided in the present invention, the second device sends the SPS configuration information to the first device, so that the first device uses a corresponding SPS resource configuration accordingly after receiving the SPS configuration information; the second device sends the SPS activation information to the first device, so as to indicate the activated SPS resource in the SPS resource configuration; and then the second device receives the SPS instruction information from the first device, where the SPS configuration information is used to indicate the SPS resource configuration used by the second device, the SPS activation information is used to indicate the activated SPS resource, the activated SPS resource is the one or more SPS resources in the SPS resource configuration, and the SPS instruction information is used to instruct to use or not to use the scheduling resource of the activated SPS resource. Therefore, in the present invention, the second device may configure different SPS resources for the first device and activate one or more of the SPS resources for the first device, the first device selects, from the one or more of the SPS resources based on the activated SPS resource or resources and a service requirement of a service, an SPS resource that meets the service requirement of the service, and the second device allocates, to another device, an SPS resource that is not used by the first device, so as to maximize scheduling resource utilization. This resolves a problem that a scheduling resource is wasted when SPS transmission with a relatively short scheduling interval is applied to a V2X service.

In a possible design, the SPS resource configuration includes at least one or a combination of the following:

an SPS scheduling interval with m available scheduling resources; or

M SPS scheduling intervals.

In a possible design, when the SPS resource configuration is the SPS scheduling interval with the m available scheduling resources, the method further includes at least one or a combination of the following:

using, by the second device, a UL grant resource, which is determined in a current subframe based on DCI scrambled by using an SPS-CRNTI, as a resource occupied by the m available scheduling resources; or using, by the second device, a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using, by the second device, DCI scrambled by using an SPS-CRNTI, to activate one or more of the m available scheduling resources.

A plurality of scheduling resources in a scheduling interval can be flexibly activated by using this implementation.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

A scheduling resource in the M SPS scheduling intervals can be flexibly activated and deactivated by using this implementation.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In this implementation, the first device can indicate to the second device a scheduling resource that is used or not used.

In a possible design, the time window is sent by the first device to the second device; or the time window is sent by the second device to the first device.

In a possible design, the method further includes:

receiving, by the second device, SPS release information from the first device, where the SPS release information is used to instruct to release some or all scheduling resources of the activated SPS resource.

In this implementation, the first device can instruct to release the some or all scheduling resources of the activated SPS resource.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI instructs to release one or more SPS scheduling intervals of the activated SPS resource.

Scheduling resources in different SPS resource configurations can be released by using this implementation.

In a possible design, the method further includes:

determining, by the second device, SPS release information, where the SPS release information is used to instruct to release some or all scheduling resources of the activated SPS resource; and sending, by the second device, the SPS release information to the first device.

In this implementation, the second device can instruct to release the some or all scheduling resources of the activated SPS resource.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

Scheduling resources in different scheduling intervals of the M SPS scheduling intervals can be released by using this implementation.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

According to a third aspect, a scheduling method is provided. The method is applied to vehicle-to-everything V2X communication and includes:

determining, by a first device based on a service requirement and/or a message type of a service, to use a random access RA preamble sequence and/or a radio resource of the RA preamble sequence, where the RA preamble sequence and/or the radio resource of the RA preamble sequence are/is used to indicate a service requirement and/or a message type of data of the first device; and initiating, by the first device, random access to a second device based on the determined RA preamble sequence and/or the radio resource of the RA preamble sequence.

According to the scheduling method provided in the present invention, the first device determines, based on the service requirement and/or the message type of the service, to use the random access RA preamble sequence and/or the radio resource of the RA preamble sequence, and then initiates random access to the second device based on the determined RA preamble sequence and/or the radio resource of the RA preamble sequence, where the RA preamble sequence and/or the radio resource of the RA preamble sequence are/is used to indicate the service requirement and/or the message type of the data of the first device. Therefore, in the present invention, the RA preamble sequence and/or the radio resource of the RA preamble sequence may be mapped to a service requirement or a service type of a V2X service, so that the first device selects a proper RA preamble sequence and/or a proper radio resource of the RA preamble sequence accordingly to initiate random access, and the second device allocates a scheduling resource to the first device accordingly. This resolves a problem that a service requirement cannot be met when a V2X service is performed.

In a possible design, the service requirement further includes a time requirement and/or a rate requirement.

In a possible design, before the determining, by a first device based on a service requirement and/or a message type of a V2X service, to use an RA preamble sequence and/or a radio resource of the RA preamble sequence, the method further includes:

receiving, by the first device from the second device, the RA preamble sequence and/or the radio resource of the RA preamble sequence.

In a possible design, when the following condition is met, the first device determines, based on the service requirement and/or the message type of the service, to use the random access RA preamble sequence and/or the radio resource of the RA preamble sequence:

there is a V2X service, or the first device finds, through calculation, that a scheduling request SR does not meet a service requirement of a V2X service.

The service requirement of the V2X service can be met with a relatively short delay by using this implementation.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

According to a fourth aspect, a scheduling method is provided. The method is applied to vehicle-to-everything V2X communication and includes:

receiving, by a second device, random access from a first device; and allocating, by the second device, a scheduling resource to the first device based on an RA preamble sequence used when the first device performs random access and/or a radio resource of the RA preamble sequence, where the RA preamble sequence and/or the radio resource of the RA preamble sequence are/is determined by the first device based on a service requirement and/or a message type of a service, and are/is used to indicate a service requirement and/or a message type of data of the first device.

According to the scheduling method provided in the present invention, the second device receives random access from the first device, and allocates, based on the RA preamble sequence used when the first device performs random access and/or the radio resource of the RA preamble sequence, the scheduling resource to the first device, where the RA preamble sequence and/or the radio resource of the RA preamble sequence are/is determined by the first device based on the service requirement and/or the message type of the service, and are/is used to indicate the service requirement and/or the message type of the data of the first device. Therefore, the RA preamble sequence and/or the radio resource of the RA preamble sequence may be mapped to a service requirement or a service type of a V2X service, so that the first device selects a proper RA preamble sequence and/or a proper radio resource of the RA preamble sequence accordingly to initiate random access, and the second device allocates a scheduling resource to the first device accordingly. This resolves a problem that a service requirement cannot be met when the V2X service is performed.

In a possible design, the service requirement further includes a time requirement and/or a rate requirement.

In a possible design, before the receiving, by a second device, random access from a first device, the method further includes:

sending, by the second device to the first device, the RA preamble sequence and/or the radio resource of the RA preamble sequence.

In a possible design, when the following condition is met, the second device receives random access from the first device:

there is a V2X service, or the first device finds, through calculation, that a scheduling request SR does not meet a service requirement of a V2X service.

The service requirement of the V2X service can be met with a relatively short delay by using this implementation.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

According to a fifth aspect, a scheduling method is provided. The method is applied to vehicle-to-everything V2X communication and includes:

measuring, by a first device, a radio resource and/or a radio signal to generate a measurement result, where the measurement result is used to instruct a second device to determine a data sending range of the first device and select a proper cell based on the sending range to send a first message; and sending, by the first device, the measurement result to the second device.

According to the scheduling method provided in the present invention, the first device measures the radio resource and/or the radio signal to generate the measurement result, and then sends the measurement result to the second device, where the measurement result is used to instruct the second device to determine the data sending range of the first device and select the proper cell based on the sending range to send the first message. In other words, the first device may send, to the second device, the measurement result indicating the data sending range, so that the second device determines the data sending range and selects the proper cell based on the data sending range to send the first message. This resolves a problem that the second device cannot obtain the data sending range from the first device.

In a possible design, the measurement result includes a measurement result of a specified cell, or a measurement result of a specified cell that meets the following condition: the measurement result is lower than a first threshold and/or lower than a measurement result of the first threshold and a first offset value.

In a possible design, the sending, by the first device, the measurement result to the second device includes one of the following:

sending, by the first device, the measurement result of the specified cell to the second device before a V2X service is started; or sending, by the first device, the measurement result of the specified cell to the second device after a V2X service is started.

In this implementation, the data sending range of the first device can be determined in different V2X service time.

In a possible design, the measurement result includes mobility information of the first device, and the mobility information includes cell-related time information and at least one of the following cell information: a cell that the first device has passed through, is passing through, or is to pass through.

In a possible design, the sending, by the first device, the measurement result to the second device includes:

sending, by the first device, the mobility information of the first device in a UU-sidelink conversion process, where a UU is a link between a terminal and a network, and a sidelink is a device-to-device link.

In a possible design, the sending, by the first device, the measurement result to the second device includes:

sending, by the first device, the measurement result and/or location information of the first device to the second device.

In a possible design, when any one of the following conditions is met, the first device sends the measurement result and/or the location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the sending, by the first device, the measurement result and/or location information of the first device to the second device includes:

periodically sending, by the first device, the measurement result and/or the location information of the first device to the second device.

In a possible design, the mobility information further includes V2X message type information and/or V2X message sending distance information of the first device.

In a possible design, the sending, by the first device, the measurement result to the second device includes:

sending, by the first device, the V2X message type information and/or the V2X message sending distance information of the first device to the second device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

According to a sixth aspect, a scheduling method is provided. The method is applied to vehicle-to-everything V2X communication and includes:

receiving, by a second device, a measurement result from a first device, where the measurement result is generated by the first device based on a measured radio resource and/or a measured radio signal;

determining, by the second device, a data sending range of the first device based on the measurement result; and selecting, by the second device, a proper cell based on the sending range to send a first message.

According to the scheduling method provided in the present invention, the second device receives the measurement result from the first device, determines the data sending range of the first device based on the measurement result, and selects the proper cell based on the sending range to send the first message, where the measurement result is generated by the first device based on the measured radio resource and/or radio signal. This resolves a problem that the second device cannot obtain the data sending range from the first device.

In a possible design, the measurement result includes a measurement result of a specified cell, or a measurement result of a specified cell that meets the following condition: the measurement result is lower than a first threshold and/or lower than a sum of the first threshold and a first offset value.

In a possible design, the receiving, by a second device, a measurement result from a first device includes one of the following:

receiving, by the second device, the measurement result of the specified cell from the first device before a V2X service is started; or receiving, by the second device, the measurement result of the specified cell from the first device after a V2X service is started.

In this implementation, the data sending range of the first device can be determined before or after the V2X service is started.

In a possible design, the measurement result includes mobility information of the first device, and the mobility information includes cell-related time information and at least one of the following cell information: a cell that the first device has passed through, is passing through, or is to pass through.

In a possible design, the receiving, by a second device, a measurement result from a first device includes:

receiving, by the second device, the mobility information of the first device in a UU-sidelink conversion process, where a UU is a link between a terminal and a network, and a sidelink is a device-to-device link.

In a possible design, the receiving, by a second device, a measurement result from a first device includes:

receiving, by the second device, the measurement result and/or location information of the first device from the first device.

In a possible design, when any one of the following conditions is met, the second device receives the measurement result and/or the location information of the first device from the first device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the receiving, by the second device, the measurement result and/or location information of the first device from the first device includes:

periodically receiving, by the second device, the measurement result and/or the location information of the first device from the first device.

In a possible design, the mobility information further includes V2X message type information and/or V2X message sending distance information of the first device.

In a possible design, the receiving, by a second device, a measurement result from a first device includes:

receiving, by the second device, the V2X message type information and/or the V2X message sending distance information of the first device from the first device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

According to a seventh aspect, a first device is provided, and the first device includes:

a receiving unit, configured to receive semi-persistent scheduling SPS configuration information from a second device, where the SPS configuration information is used to indicate an SPS resource configuration used by the second device; and the receiving unit is further configured to receive SPS activation information from the second device, where the SPS activation information is used to indicate an activated SPS resource, and the activated SPS resource is one or more SPS resources in the SPS resource configuration; and a sending unit, configured to send SPS instruction information to the second device, where the SPS instruction information is used to instruct to use or not to use a scheduling resource of the activated SPS resource.

The first device provided in the present invention receives the SPS configuration information from the second device, and sends the SPS instruction information to the second device after receiving the SPS activation information from the second device, where the SPS configuration information is used to indicate the SPS resource configuration used by the second device, the SPS activation information is used to indicate the activated SPS resource, the activated SPS resource is the one or more SPS resources in the SPS resource configuration, and the SPS instruction information is used to instruct to use or not to use the scheduling resource of the activated SPS resource. Therefore, in the present invention, the second device may configure different SPS resources for the first device and activate one or more of the SPS resources for the first device, the first device selects, from the one or more of the SPS resources based on the activated SPS resource or resources and a service requirement of a service, an SPS resource that meets the service requirement of the service, and the second device allocates, to another device, an SPS resource that is not used by the first device, so as to maximize scheduling resource utilization. This resolves a problem that a scheduling resource is wasted when SPS transmission with a relatively short scheduling interval is applied to a V2X service.

In a possible design, the SPS resource configuration includes at least one or a combination of the following:

an SPS scheduling interval with m available scheduling resources; or

M SPS scheduling intervals.

In a possible design, the first device further includes a processing unit, configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In a possible design, the time window is sent by the sending unit to the second device; or the time window is sent by the second device to the receiving unit.

In a possible design, the processing unit is further configured to determine SPS release information, where the SPS release information is used to instruct to release some or all scheduling resources of the activated SPS resource; and the sending unit is further configured to send the SPS release information to the second device.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI is used to instruct to release one or more SPS scheduling intervals of the activated SPS resource.

In a possible design, the receiving unit is further configured to receive SPS release information from the second device, where the SPS release information is used to instruct to release some or all scheduling resources of the activated SPS resource.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

The first device in this embodiment of the present invention may be configured to perform the method procedure described in the first aspect. Therefore, for technical effects that the first device can have, refer to the method embodiment described in the first aspect, and details are not repeated in this embodiment of the present invention.

According to an eighth aspect, a second device is provided, and the second device includes:

a sending unit, configured to send semi-persistent scheduling SPS configuration information to a first device, where the SPS configuration information is used to indicate an SPS resource configuration used by the second device; and the sending unit is further configured to send SPS activation information to the first device, where the SPS activation information is used to indicate an activated SPS resource, and the activated SPS resource is one or more SPS resources in the SPS resource configuration; and a receiving unit, configured to receive SPS instruction information from the first device, where the SPS instruction information is used to instruct to use or not to use a scheduling resource of the activated SPS resource.

The second device provided in the present invention sends the SPS configuration information to the first device, so that the first device uses a corresponding SPS resource configuration accordingly after receiving the SPS configuration information; the second device sends the SPS activation information to the first device, so as to indicate the activated SPS resource in the SPS resource configuration; and then the second device receives the SPS instruction information from the first device, where the SPS configuration information is used to indicate the SPS resource configuration used by the second device, the SPS activation information is used to indicate the activated SPS resource, the activated SPS resource is the one or more SPS resources in the SPS resource configuration, and the SPS instruction information is used to instruct to use or not to use the scheduling resource of the activated SPS resource. Therefore, in the present invention, the second device may configure different SPS resources for the first device and activate one or more of the SPS resources for the first device, the first device selects, from the one or more of the SPS resources based on the activated SPS resource or resources and a service requirement of a service, an SPS resource that meets the service requirement of the service, and the second device allocates, to another device, an SPS resource that is not used by the first device, so as to maximize scheduling resource utilization. This resolves a problem that a scheduling resource is wasted when SPS transmission with a relatively short scheduling interval is applied to a V2X service.

In a possible design, the SPS resource configuration includes at least one or a combination of the following:

an SPS scheduling interval with m available scheduling resources; or

M SPS scheduling intervals.

In a possible design, the second device further includes a processing unit, configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In a possible design, the time window is sent by the sending unit to the second device; or the time window is sent by the second device to the receiving unit.

In a possible design, the receiving unit is further configured to receive SPS release information from the first device, where the SPS release information is used to instruct to release some or all scheduling resources of the activated SPS resource.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI instructs to release one or more SPS scheduling intervals of the activated SPS resource.

In a possible design, the processing unit is further configured to determine SPS release information, where the SPS release information is used to instruct to release some or all scheduling resources of the activated SPS resource; and the sending unit is further configured to send the SPS release information to the first device.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

The second device in this embodiment of the present invention may be configured to perform the method procedure described in the second aspect. Therefore, for technical effects that can be obtained by the second device, refer to the method embodiment described in the second aspect, and details are not repeated in this embodiment of the present invention.

According to a ninth aspect, a first device is provided. The first device is applied to vehicle-to-everything V2X communication and includes:

a processing unit, configured to determine, based on a service requirement and/or a message type of a service, to use a random access RA preamble sequence and/or a radio resource of the RA preamble sequence, where the RA preamble sequence and/or the radio resource of the RA preamble sequence are/is used to indicate a service requirement and/or a message type of data of the first device; and a sending unit, configured to initiate random access to a second device based on the determined RA preamble sequence and/or the radio resource of the RA preamble sequence.

The first device provided in the present invention determines, based on the service requirement and/or the message type of the service, to use the random access RA preamble sequence and/or the radio resource of the RA preamble sequence, and then initiates random access to the second device based on the determined RA preamble sequence and/or the radio resource of the RA preamble sequence, where the RA preamble sequence and/or the radio resource of the RA preamble sequence are/is used to indicate the service requirement and/or the message type of the data of the first device. Therefore, in the present invention, the RA preamble sequence and/or the radio resource of the RA preamble sequence may be mapped to a service requirement or a service type of a V2X service, so that the first device selects a proper RA preamble sequence and/or a proper radio resource of the RA preamble sequence accordingly to initiate random access, and the second device allocates a scheduling resource to the first device accordingly. This resolves a problem that a service requirement cannot be met when a V2X service is performed.

In a possible design, the service requirement further includes a time requirement and/or a rate requirement.

In a possible design, the first device further includes a receiving unit, configured to: before the processing unit determines, based on a service requirement and/or a message type of a V2X service, to use an RA preamble sequence and/or a radio resource of the RA preamble sequence, receive the RA preamble sequence and/or the radio resource of the RA preamble sequence from the second device.

In a possible design, the processing unit is further configured to: when there is a V2X service, or the processing unit finds, through calculation, that a scheduling request SR does not meet a service requirement of a V2X service, determine, based on the service requirement and/or the message type of the service, to use the random access RA preamble sequence and/or the radio resource of the RA preamble sequence.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

The first device in this embodiment of the present invention may be configured to perform the method procedure described in the third aspect. Therefore, for technical effects that can be obtained by the first device, refer to the method embodiment described in the third aspect, and details are not repeated in this embodiment of the present invention.

According to a tenth aspect, a second device is provided. The second device is applied to vehicle-to-everything V2X communication and includes:

a receiving unit, configured to receive random access from a first device; and a processing unit, configured to allocate a scheduling resource to the first device based on an RA preamble sequence used when the first device performs random access and/or a radio resource of the RA preamble sequence, where the RA preamble sequence and/or the radio resource of the RA preamble sequence are/is determined by the first device based on a service requirement and/or a message type of a service, and are/is used to indicate a service requirement and/or a message type of data of the first device.

The second device provided in the present invention receives random access from the first device, and allocates, based on the RA preamble sequence used when the first device performs random access and/or the radio resource of the RA preamble sequence, the scheduling resource to the first device, where the RA preamble sequence and/or the radio resource of the RA preamble sequence are/is determined by the first device based on the service requirement and/or the message type of the service, and are/is used to indicate the service requirement and/or the message type of the data of the first device. Therefore, the RA preamble sequence and/or the radio resource of the RA preamble sequence may be mapped to a service requirement or a service type of a V2X service, so that the first device selects a proper RA preamble sequence and/or a proper radio resource of the RA preamble sequence accordingly to initiate random access, and the second device allocates a scheduling resource to the first device accordingly. This resolves a problem that a service requirement cannot be met when the V2X service is performed.

In a possible design, the service requirement further includes a time requirement and/or a rate requirement.

In a possible design, the second device further includes a sending unit, configured to: before the receiving unit receives random access from the first device, send the RA preamble sequence and/or the radio resource of the RA preamble sequence to the first device.

In a possible design, the receiving unit is further configured to: when there is a V2X service, or the first device finds, through calculation, that a scheduling request SR does not meet a service requirement of a V2X service, receive random access from the first device.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

The second device in this embodiment of the present invention may be configured to perform the method procedure described in the fourth aspect. Therefore, for technical effects that can be obtained by the second device, refer to the method embodiment described in the fourth aspect, and details are not repeated in this embodiment of the present invention.

According to an eleventh aspect, a first device is provided. The first device is applied to vehicle-to-everything V2X communication and includes:

a processing unit, configured to measure a radio resource and/or a radio signal to generate a measurement result, where the measurement result is used to instruct a second device to determine a data sending range of the first device and select a proper cell based on the sending range to send a first message; and a sending unit, configured to send the measurement result to the second device.

The first device provided in the present invention measures the radio resource and/or the radio signal to generate the measurement result, and then sends the measurement result to the second device, where the measurement result is used to instruct the second device to determine the data sending range of the first device and select the proper cell based on the sending range to send the first message. In other words, the first device may send, to the second device, the measurement result indicating the data sending range, so that the second device determines the data sending range and selects the proper cell based on the data sending range to send the first message. This resolves a problem that the second device cannot obtain the data sending range from the first device.

In a possible design, the measurement result includes a measurement result of a specified cell, or a measurement result of a specified cell that meets the following condition: the measurement result is lower than a first threshold and/or lower than a measurement result of the first threshold and a first offset value.

In a possible design, the sending unit is specifically configured to perform one of the following operations:

sending the measurement result of the specified cell to the second device before a V2X service is started; or sending the measurement result of the specified cell to the second device after a V2X service is started.

In a possible design, the measurement result includes mobility information of the first device, and the mobility information includes cell-related time information and at least one of the following cell information: a cell that the first device has passed through, is passing through, or is to pass through.

In a possible design, the sending unit is specifically configured to send the mobility information of the first device in a UU-sidelink conversion process. A UU is a link between a terminal and a network, and a sidelink is a device-to-device link.

In a possible design, the sending unit is specifically configured to send the measurement result and/or location information of the first device to the second device.

In a possible design, the sending unit is specifically configured to: when any one of the following conditions is met, send the measurement result and/or the location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the sending unit is specifically configured to periodically send the measurement result and/or the location information of the first device to the second device.

In a possible design, the mobility information further includes V2X message type information and/or V2X message sending distance information of the first device.

In a possible design, the sending unit is specifically configured to send the V2X message type information and/or the V2X message sending distance information of the first device to the second device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

The first device in this embodiment of the present invention may be configured to perform the method procedure described in the fifth aspect. Therefore, for technical effects that can be obtained by the first device, refer to the method embodiment described in the fifth aspect, and details are not repeated in this embodiment of the present invention.

According to a twelfth aspect, a second device is provided. The second device is applied to vehicle-to-everything V2X communication and includes:

a receiving unit, configured to receive a measurement result from a first device, where the measurement result is generated by the first device based on a measured radio resource and/or a measured radio signal;

a processing unit, configured to determine a data sending range of the first device based on the measurement result; and a sending unit, configured to select a proper cell based on the sending range to send a first message.

The second device provided in the present invention receives the measurement result from the first device, determines the data sending range of the first device based on the measurement result, and selects the proper cell based on the sending range to send the first message, where the measurement result is generated by the first device based on the measured radio resource and/or radio signal. This resolves a problem that the second device cannot obtain the data sending range from the first device.

In a possible design, the measurement result includes a measurement result of a specified cell, or a measurement result of a specified cell that meets the following condition: the measurement result is lower than a first threshold and/or lower than a sum of the first threshold and a first offset value.

In a possible design, the receiving unit is specifically configured to perform one of the following operations:

receiving the measurement result of the specified cell from the first device before a V2X service is started; or receiving the measurement result of the specified cell from the first device after a V2X service is started.

In a possible design, the measurement result includes mobility information of the first device, and the mobility information includes cell-related time information and at least one of the following cell information: a cell that the first device has passed through, is passing through, or is to pass through.

In a possible design, the receiving unit is specifically configured to receive the mobility information of the first device in a UU-sidelink conversion process. A UU is a link between a terminal and a network, and a sidelink is a device-to-device link.

In a possible design, the receiving unit is specifically configured to receive the measurement result and/or location information of the first device from the first device.

In a possible design, the receiving unit is specifically configured to: when any one of the following conditions is met, receive the measurement result and/or the location information of the first device from the first device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the receiving unit is specifically configured to periodically receive the measurement result and/or the location information of the first device from the first device.

In a possible design, the mobility information further includes V2X message type information and/or V2X message sending distance information of the first device.

In a possible design, the receiving unit is specifically configured to receive the V2X message type information and/or the V2X message sending distance information of the first device from the first device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

The first device in this embodiment of the present invention may be configured to perform the method procedure described in the sixth aspect. Therefore, for technical effects that can be obtained by the first device, refer to the method embodiment described in the sixth aspect, and details are not repeated in this embodiment of the present invention.

According to a thirteenth aspect, a communications system is provided, including the first device described in the seventh aspect and the second device described in the eighth aspect, or the first device described in the ninth aspect and the second device described in the tenth aspect, or the first device described in the eleventh aspect and the second device described in the twelfth aspect.

The communications system provided in the present invention includes the first device described in the seventh aspect and the second device described in the eighth aspect, or the first device described in the ninth aspect and the second device described in the tenth aspect, or the first device described in the eleventh aspect and the second device described in the twelfth aspect. Therefore, for technical effects that can be obtained by the communications system, refer to those of the first device described in the seventh aspect and the second device described in the eighth aspect, or those of the first device described in the ninth aspect and the second device described in the tenth aspect, or those of the first device described in the eleventh aspect and the second device described in the twelfth aspect, and details are not repeated in this embodiment of the present invention.

According to a fourteenth aspect, a first device is provided, including a processor, a first interface circuit, a second interface circuit, a memory, and a bus, where the processor, the first interface circuit, the second interface circuit, and the memory are connected and implement mutual communication, by using the bus; and the processor is configured to execute program code in the memory to control the first interface circuit and the second interface circuit to perform the following operations:

receiving, by the first interface circuit, semi-persistent scheduling SPS configuration information from a second device, where the SPS configuration information is used to indicate an SPS resource configuration used by the second device;

receiving, by the first interface circuit, SPS activation information from the second device, where the SPS activation information is used to indicate an activated SPS resource, and the activated SPS resource is one or more SPS resources in the SPS resource configuration; and sending, by the second interface circuit, SPS instruction information to the second device, where the SPS instruction information is used to instruct to use or not to use a scheduling resource of the activated SPS resource.

In a possible design, the SPS resource configuration includes at least one or a combination of the following:

an SPS scheduling interval with m available scheduling resources; or

M SPS scheduling intervals.

In a possible design, the processor is configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In a possible design, the time window is sent by the second interface circuit to the second device; or the time window is sent by the second device to the first interface circuit.

In a possible design, the processor is further configured to determine SPS release information, where the SPS release information is used to instruct to release some or all scheduling resources of the activated SPS resource; and the second interface circuit is further configured to send the SPS release information to the second device.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI is used to instruct to release one or more SPS scheduling intervals of the activated SPS resource.

In a possible design, the first interface circuit is further configured to receive SPS release information from the second device, where the SPS release information is used to instruct to release some or all scheduling resources of the activated SPS resource.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

The first device in this embodiment of the present invention may be configured to perform the method procedure described in the first aspect. Therefore, for technical effects that can be obtained by the first device, refer to the method embodiment described in the first aspect, and details are not repeated in this embodiment of the present invention.

According to a fifteenth aspect, a second device is provided, including a processor, a first interface circuit, a second interface circuit, a memory, and a bus, where the processor, the first interface circuit, the second interface circuit, and the memory are connected and implement mutual communication, by using the bus; and the processor is configured to execute program code in the memory to control the first interface circuit and the second interface circuit to perform the following operations:

sending, by the first interface circuit, semi-persistent scheduling SPS configuration information to a first device, where the SPS configuration information is used to indicate an SPS resource configuration used by the second device;

sending, by the first interface circuit, SPS activation information to the first device, where the SPS activation information is used to indicate an activated SPS resource, and the activated SPS resource is one or more SPS resources in the SPS resource configuration; and receiving, by the second interface circuit, SPS instruction information from the first device, where the SPS instruction information is used to instruct to use or not to use a scheduling resource of the activated SPS resource.

In a possible design, the SPS resource configuration includes at least one or a combination of the following:

an SPS scheduling interval with m available scheduling resources; or

M SPS scheduling intervals.

In a possible design, the processor is configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using an SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

In a possible design, when the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

In a possible design, that the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

In a possible design, the time window is sent by the first interface circuit to the second device; or the time window is sent by the second device to the second interface circuit.

In a possible design, the second interface circuit is further configured to receive SPS release information from the first device, where the SPS release information is used to instruct to release some or all scheduling resources of the activated SPS resource.

In a possible design, that the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI instructs to release one or more SPS scheduling intervals of the activated SPS resource.

In a possible design, the processor is further configured to determine SPS release information, where the SPS release information is used to instruct to release some or all scheduling resources of the activated SPS resource; and the first interface circuit is further configured to send the SPS release information to the first device.

In a possible design, when the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

In a possible design, the SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

In a possible design, the SPS is used between a network and a terminal or between terminals.

The second device in this embodiment of the present invention may be configured to perform the method procedure described in the second aspect. Therefore, for technical effects that can be obtained by the second device, refer to the method embodiment described in the second aspect, and details are not repeated in this embodiment of the present invention.

According to a sixteenth aspect, a first device is provided, where the first device is applied to vehicle-to-everything V2X communication, and includes a processor, a first interface circuit, a memory, and a bus, where the processor, the first interface circuit, and the memory are connected and implement mutual communication, by using the bus; and the processor is configured to execute program code in the memory to control the first interface circuit to perform the following operations:

determining, by the processor based on a service requirement and/or a message type of a service, to use a random access RA preamble sequence and/or a radio resource of the RA preamble sequence, where the RA preamble sequence and/or the radio resource of the RA preamble sequence are/is used to indicate a service requirement and/or a message type of data of the first device; and initiating, by the first interface circuit, random access to a second device based on the determined RA preamble sequence and/or the radio resource of the RA preamble sequence.

In a possible design, the service requirement further includes a time requirement and/or a rate requirement.

In a possible design, the first device further includes a second interface circuit, configured to: before the processor determines, based on a service requirement and/or a message type of a V2X service, to use an RA preamble sequence and/or a radio resource of the RA preamble sequence, receive the RA preamble sequence and/or the radio resource of the RA preamble sequence from the second device.

In a possible design, the processor is further configured to: when there is a V2X service, or the processor finds, through calculation, that a scheduling request SR does not meet a service requirement of a V2X service, determine, based on the service requirement and/or the message type of the service, to use the random access RA preamble sequence and/or the radio resource of the RA preamble sequence.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

The first device in this embodiment of the present invention may be configured to perform the method procedure described in the third aspect. Therefore, for technical effects that can be obtained by the first device, refer to the method embodiment described in the third aspect, and details are not repeated in this embodiment of the present invention.

According to a seventeenth aspect, a second device is provided, where the second device is applied to vehicle-to-everything V2X communication, and includes a processor, a first interface circuit, a memory, and a bus, where the processor, the first interface circuit, and the memory are connected and implement mutual communication, by using the bus; and the processor is configured to execute program code in the memory to control the first interface circuit to perform the following operations:

receiving, by the first interface circuit, random access from a first device; and allocating, by the processor, a scheduling resource to the first device based on an RA preamble sequence used when the first device performs random access and/or a radio resource of the RA preamble sequence, where the RA preamble sequence and/or the radio resource of the RA preamble sequence are/is determined by the first device based on a service requirement and/or a message type of a service, and are/is used to indicate a service requirement and/or a message type of data of the first device.

In a possible design, the service requirement further includes a time requirement and/or a rate requirement.

In a possible design, the second device further includes a second interface circuit, configured to: before the first interface circuit receives random access from the first device, send the RA preamble sequence and/or the radio resource of the RA preamble sequence to the first device.

In a possible design, the first interface circuit is further configured to: when there is a V2X service, or the first device finds, through calculation, that a scheduling request SR does not meet a service requirement of a V2X service, receive random access from the first device.

In a possible design, the RA preamble sequence includes a specified preamble sequence separated from an existing RA preamble sequence or a preamble sequence obtained by extending an existing RA preamble sequence.

In a possible design, the service requirement of the service includes the service requirement of the V2X service.

The second device in this embodiment of the present invention may be configured to perform the method procedure described in the fourth aspect. Therefore, for technical effects that can be obtained by the second device, refer to the method embodiment described in the fourth aspect, and details are not repeated in this embodiment of the present invention.

According to an eighteenth aspect, a first device is provided, where the first device is applied to vehicle-to-everything V2X communication, and includes a processor, a first interface circuit, a memory, and a bus, where the processor, the first interface circuit, and the memory are connected and implement mutual communication, by using the bus; and the processor is configured to execute program code in the memory to control the first interface circuit to perform the following operations:

measuring, by the processor, a radio resource and/or a radio signal to generate a measurement result, where the measurement result is used to instruct a second device to determine a data sending range of the first device and select a proper cell based on the sending range to send a first message; and sending, by the first interface circuit, the measurement result to the second device.

In a possible design, the measurement result includes a measurement result of a specified cell, or a measurement result of a specified cell that meets the following condition: the measurement result is lower than a first threshold and/or lower than a measurement result of the first threshold and a first offset value.

In a possible design, the first interface circuit is specifically configured to perform one of the following operations:

sending the measurement result of the specified cell to the second device before a V2X service is started; or sending the measurement result of the specified cell to the second device after a V2X service is started.

In a possible design, the measurement result includes mobility information of the first device, and the mobility information includes cell-related time information and at least one of the following cell information: a cell that the first device has passed through, is passing through, or is to pass through.

In a possible design, the first interface circuit is specifically configured to send the mobility information of the first device in a UU-sidelink conversion process. A UU is a link between a terminal and a network, and a sidelink is a device-to-device link.

In a possible design, the first interface circuit is specifically configured to send the measurement result and/or location information of the first device to the second device.

In a possible design, the first interface circuit is specifically configured to: when any one of the following conditions is met, send the measurement result and/or the location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the first interface circuit is specifically configured to periodically send the measurement result and/or the location information of the first device to the second device.

In a possible design, the mobility information further includes V2X message type information and/or V2X message sending distance information of the first device.

In a possible design, the first interface circuit is specifically configured to send the V2X message type information and/or the V2X message sending distance information of the first device to the second device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

The first device in this embodiment of the present invention may be configured to perform the method procedure described in the fifth aspect. Therefore, for technical effects that can be obtained by the first device, refer to the method embodiment described in the fifth aspect, and details are not repeated in this embodiment of the present invention.

According to a nineteenth aspect, a second device is provided, where the second device is applied to vehicle-to-everything V2X communication, and includes a processor, a first interface circuit, a second interface circuit, a memory, and a bus, where the processor, the first interface circuit, the second interface circuit, and the memory are connected and implement mutual communication, by using the bus; and the processor is configured to execute program code in the memory to control the first interface circuit and the second interface circuit to perform the following operations:

receiving, by the first interface circuit, a measurement result from a first device, where the measurement result is generated by the first device based on a measured radio resource and/or a measured radio signal;

determining, by the processor, a data sending range of the first device based on the measurement result; and selecting, by the second interface circuit, a proper cell based on the sending range to send a first message.

In a possible design, the measurement result includes a measurement result of a specified cell, or a measurement result of a specified cell that meets the following condition: the measurement result is lower than a first threshold and/or lower than a sum of the first threshold and a first offset value.

In a possible design, the first interface circuit is specifically configured to perform one of the following operations:

receiving the measurement result of the specified cell from the first device before a V2X service is started; or receiving the measurement result of the specified cell from the first device after a V2X service is started.

In a possible design, the measurement result includes mobility information of the first device, and the mobility information includes cell-related time information and at least one of the following cell information: a cell that the first device has passed through, is passing through, or is to pass through.

In a possible design, the first interface circuit is specifically configured to send the mobility information of the first device in a UU-sidelink conversion process. A UU is a link between a terminal and a network, and a sidelink is a device-to-device link.

In a possible design, the first interface circuit is specifically configured to receive the measurement result and/or location information of the first device from the first device.

In a possible design, the first interface circuit is specifically configured to: when any one of the following conditions is met, receive the measurement result and/or the location information of the first device from the first device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

In a possible design, the first interface circuit is specifically configured to periodically receive the measurement result and/or the location information of the first device from the first device.

In a possible design, the mobility information further includes V2X message type information and/or V2X message sending distance information of the first device.

In a possible design, the first interface circuit is specifically configured to receive the V2X message type information and/or the V2X message sending distance information of the first device from the first device by using one or a combination of a radio resource control RRC layer, a Medium Access Control MAC layer, and a physical PHY layer.

In a possible design, the first message is one of the following messages: a V2X message, a wearable service message, a cellular-based Narrowband Internet of Things NB-IoT service message, and a broadband service message.

The first device in this embodiment of the present invention may be configured to perform the method procedure described in the sixth aspect. Therefore, for technical effects that can be obtained by the first device, refer to the method embodiment described in the sixth aspect, and details are not repeated in this embodiment of the present invention.

According to a twentieth aspect, a communications system is provided, including the first device described in the fourteenth aspect and the second device described in the fifteenth aspect, or the first device described in the sixteenth aspect and the second device described in the seventeenth aspect, or the first device described in the eighteenth aspect and the second device described in the nineteenth aspect.

The communications system provided in the present invention includes the first device described in the fourteenth aspect and the second device described in the fifteenth aspect, or the first device described in the sixteenth aspect and the second device described in the seventeenth aspect, or the first device described in the eighteenth aspect and the second device described in the nineteenth aspect. Therefore, for technical effects that can be obtained by the communications system, refer to those of the first device described in the fourteenth aspect and the second device described in the fifteenth aspect, or those of the first device described in the sixteenth aspect and the second device described in the seventeenth aspect, or those of the first device described in the eighteenth aspect and the second device described in the nineteenth aspect, and details are not repeated in this embodiment of the present invention.

To sum up, according to the scheduling method, the device, and the system provided in the present invention, the second device configures different SPS resources for the first device and activates one or more of the SPS resources for the first device, the first device selects, from the one or more of the SPS resources based on the activated SPS resource and the service requirement of the service, the SPS resource that meets the service requirement of the service, and the second device allocates, to another device, an SPS resource that is not used by the first device, so as to maximize scheduling resource utilization. This resolves a problem that a scheduling resource is wasted when SPS transmission with a relatively short scheduling interval is applied to a V2X service.

Alternatively, according to the scheduling method, the device, and the system provided in the present invention, the RA preamble sequence and/or the radio resource of the RA preamble sequence are/is mapped to a service requirement or a service type of the V2X service, so that the first device accordingly selects the proper RA preamble sequence and/or the proper radio resource of the RA preamble sequence to initiate random access, and the second device accordingly allocates the scheduling resource to the first device. This resolves a problem that a service requirement cannot be met when the V2X service is performed.

Alternatively, according to the scheduling method, the device, and the system provided in the present invention, the first device sends, to the second device, the measurement result indicating the data sending range, so that the second device determines the data sending range and selects the proper cell based on the data sending range to send the first message. This resolves a problem that the second device cannot obtain the data sending range from the first device.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and a person of ordinary skill in the art may derive other drawings from these accompanying drawings without creative efforts.

FIG. 12 is a schematic diagram of indicating an SPS scheduling interval by using a bitmap in DCI according to an embodiment of the present invention;

DESCRIPTION OF EMBODIMENTS

Figure 1:
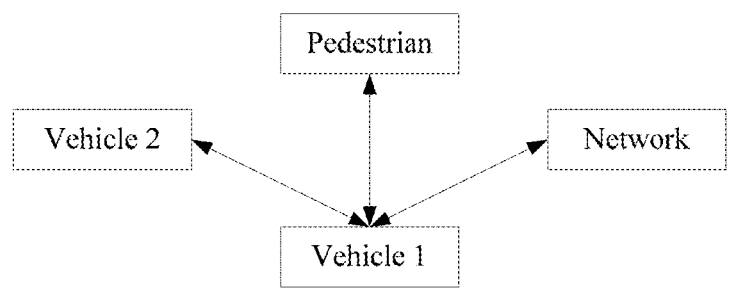
FIG. 1 is a schematic diagram of a V2X system in a possible implementation.
Figure 2:
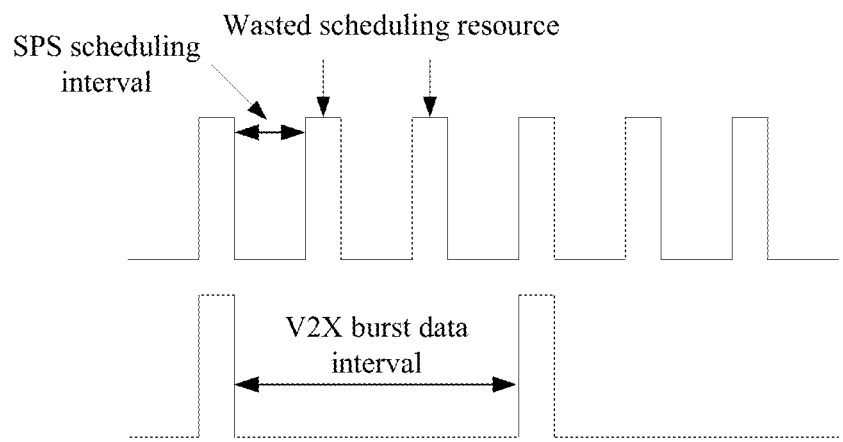
FIG. 2 is a schematic diagram of scheduling resource waste caused when SPS is applied to a V2X system in the prior art.
Figure 3:
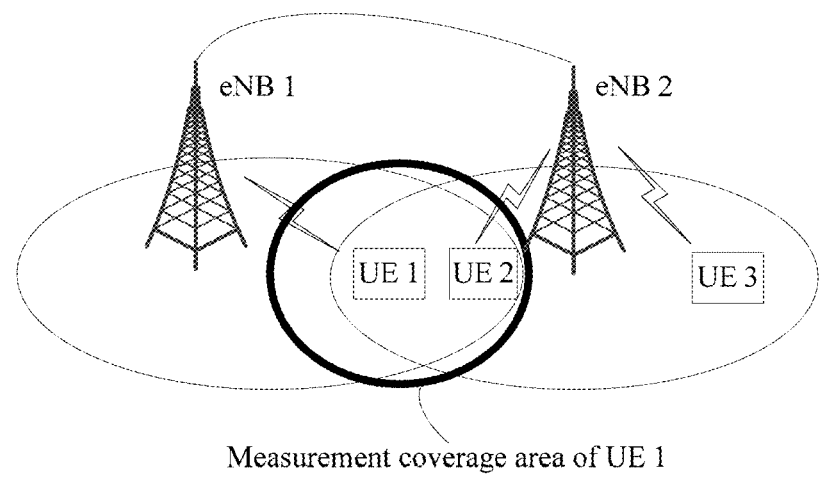
FIG. 3 is a schematic diagram of perceiving a UE measurement coverage area by a network side.

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Terms such as "component", "module", and "system" used in this application are used to indicate computer-related entities. The computer-related entities may be hardware, firmware, a combination of hardware and software, software, or software that is running. For example, a component may be, but is not limited to, a process running on a processor, a processor, an object, an executable file, a thread of execution, a program, and/or a computer. As an example, both an application that runs on a computing device and the computing device may be components. One or more components may reside within a process and/or a thread of execution, and a component may be located on one computer and/or distributed between two or more computers. In addition, these components can be executed from various computer-readable media that have various data structures. These components may communicate by using a local and/or remote process and based on, for example, a signal having one or more data packets (for example, data from one component, where the component interacts with another component in a local system or a distributed system, and/or interacts with other systems via a network such as the Internet by using a signal).

In addition, various aspects are described in this application with reference to a wireless network device. The wireless network device may be a base station. The base station may be configured to communicate with one or more user equipments, or may be configured to communicate with one or more base stations having some user equipment functions (for example, communication between a macro base station and a micro base station such as an access point). The wireless network device may alternatively be user equipment. The user equipment may be configured to communicate with one or more user equipments (for example, D2D communication), or may communicate with one or more base stations. The user equipment may also be referred to as a user terminal and may include some or all of functions of a system, a subscriber unit, a subscriber station, a mobile station, a mobile wireless terminal, a mobile device, a node, a device, a remote station, a remote terminal, a terminal, a wireless communications device, a wireless communications apparatus, or a user agent. The user equipment may be a cellular phone, a cordless phone, a Session Initiation Protocol (SIP) phone, a smartphone, a wireless local loop (WLL) station, a personal digital assistant (PDA), a laptop computer, a handheld communications device, a handheld computing device, a satellite radio device, a wireless modem card, and/or another processing device configured for communication in a wireless system. The base station may also be referred to as an access point, a node, a NodeB, an evolved NodeB (eNB), or another network entity, and may include some or all of functions of the foregoing network entities. The base station may communicate with a wireless terminal by using an air interface. The communication may be performed by using one or more cells. The base station may convert a received air interface frame to an IP packet to be used for routing between the wireless terminal and a remaining part of an access network. The access network includes an Internet Protocol (IP) network. The base station may further coordinate attribute management of an air interface, and may also be a gateway between a wired network and a wireless network.

In this application, all aspects, embodiments, or characteristics are presented based on a system that may include a plurality of devices, components, modules, and the like. It should be understood that each system may include another device, component, module, or the like, and/or may not include all devices, components, modules, or the like discussed with reference to the accompanying drawings. In addition, a combination of these solutions may be used.

Moreover, in the embodiments of the present invention, the term "for example" is used to represent an example, illustration, or a description. Any embodiment or design solution described as "an example" in this application shall not be interpreted to be more preferable or advantageous than other embodiments or design solutions. Exactly, the term "for example" is used to present a concept in a specific manner.

In the embodiments of the present invention, information, a signal, a message, and a channel may be used interchangeably sometimes. It should be noted that they express a same meaning when their differences are not emphasized. The terms "of", "relevant", and "corresponding" may be used interchangeably sometimes. It should be noted that they express a same meaning when their differences are not emphasized.

A network architecture and a service scenario that are described in the embodiments of the present invention are intended to describe the technical solutions in the embodiments of the present invention more clearly, and do not constitute any limitation on the technical solutions provided in the embodiments of the present invention. A person of ordinary skill in the art may know that, with evolution of network architectures and emergence of new service scenarios, the technical solutions provided in the embodiments of the present invention are also applicable to a similar technical issue.

The embodiments of the present invention may be applied to both a scenario of time division duplex (TDD) and a scenario of frequency division duplex (FDD).

The embodiments of the present invention are described based on a scenario of a V2X network in a wireless communications network. It should be noted that the solutions in the embodiments of the present invention may also be applied to another wireless communications network, and a corresponding name may be replaced with a name of a corresponding function in the another wireless communications network.

In the present invention, a second device configures different SPS resources for a first device and activates one or more of the SPS resources for the first device, the first device selects, from the one or more of the SPS resources based on the activated SPS resource or resources and a service requirement of a service, an SPS resource that meets the service requirement of the service, and the second device allocates an SPS resource that is not used by the first device to another device. This maximizes scheduling resource utilization, and resolves a problem that a scheduling resource is wasted when SPS transmission with a relatively short scheduling interval is applied to a V2X service.

Figure 4:
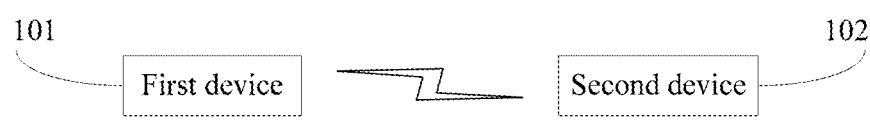
FIG. 4 is a schematic diagram of a communications system according to an embodiment of the present invention.

The scheduling method and the device that are provided in the present invention are applied to V2X communication shown in FIG. 1. Referring to FIG. 4, FIG. 4 is a schematic diagram of a possible application scenario according to an embodiment of this application. The device provided in the present invention includes a first device 101 and a second device 102. A V2X service is performed between the first device and the second device. The first device may be an in-vehicle device or user equipment (UE) on a vehicle 1 shown in FIG. 1. The second device may be a network device on a network shown in FIG. 1, or an in-vehicle device or evolved node B (eNB) on a vehicle 2.

Figure 5:
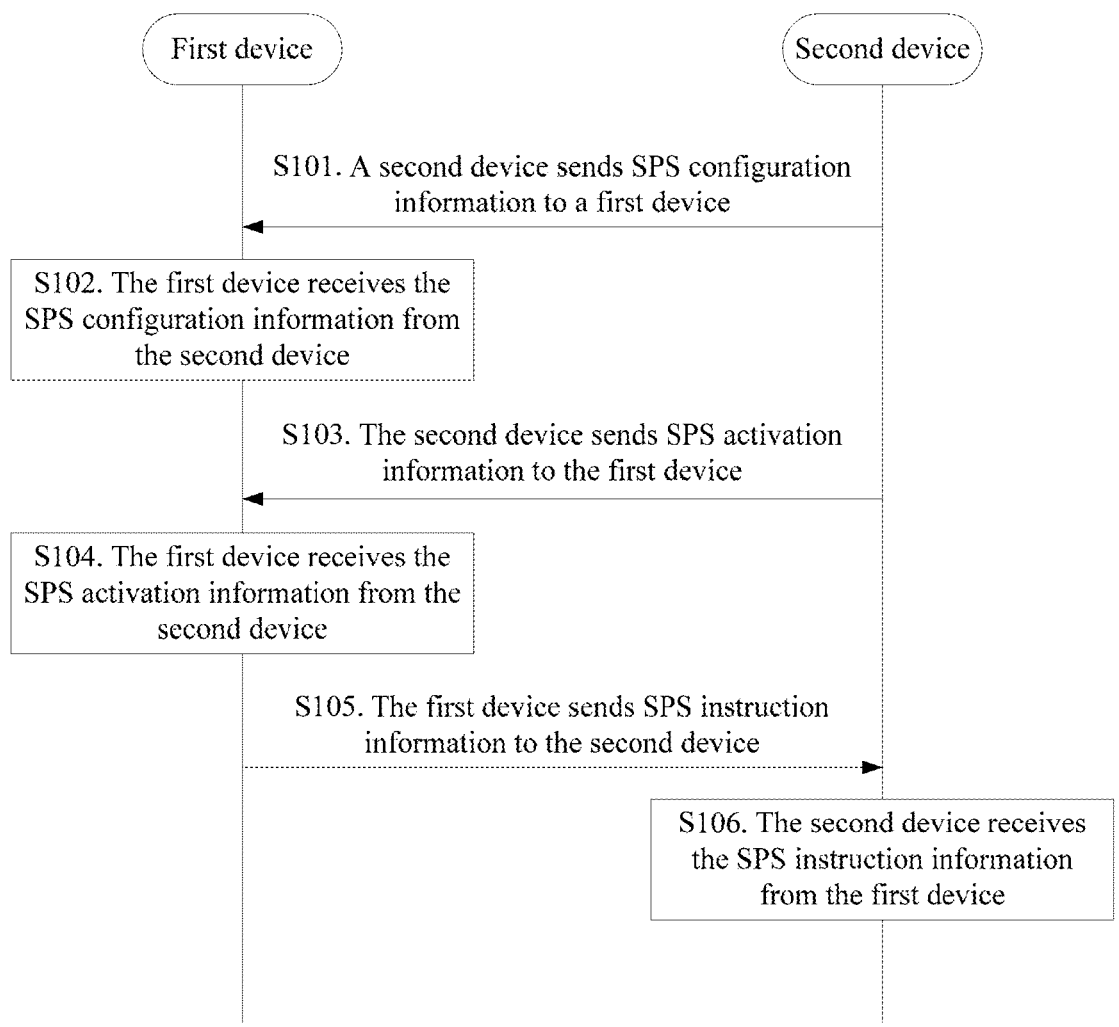
FIG. 5 is a schematic flowchart of a scheduling method according to an embodiment of the present invention.

The present invention provides a scheduling method. As shown in FIG. 5, the method includes the following steps.

S101. A second device sends SPS configuration information to a first device, where the SPS configuration information indicates an SPS resource configuration used by the second device.

Optionally, SPS configuration information includes at least one or a combination of the following: type 1, namely, an SPS scheduling interval with m available scheduling resources; or type 2, namely, M SPS scheduling intervals.

The combination means that, there are M SPS scheduling intervals and there may be m available scheduling resources within each SPS scheduling interval.

Figure 6:
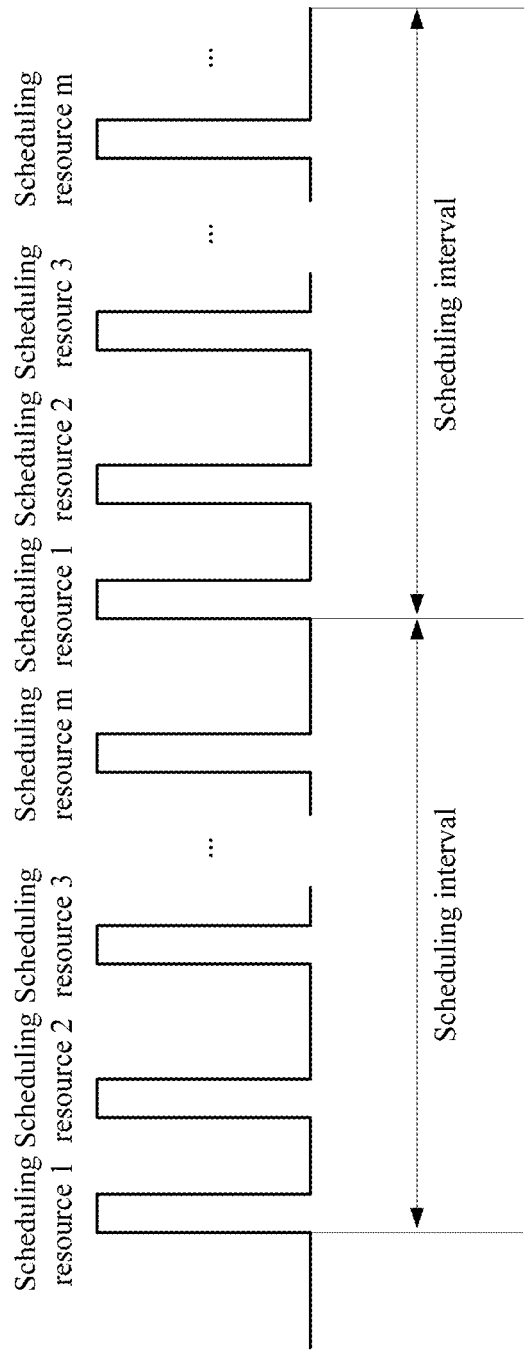
FIG. 6 is a schematic diagram of an SPS resource configuration according to an embodiment of the present invention.

Specifically, for the type 1, as shown in FIG. 6, the SPS resource configuration used by the second device may include: an SPS scheduling interval with m available scheduling resources. All scheduling resources in one scheduling interval may be or may not be at an equal interval in time domain, and all scheduling intervals have same scheduling resources.

Figure 7:
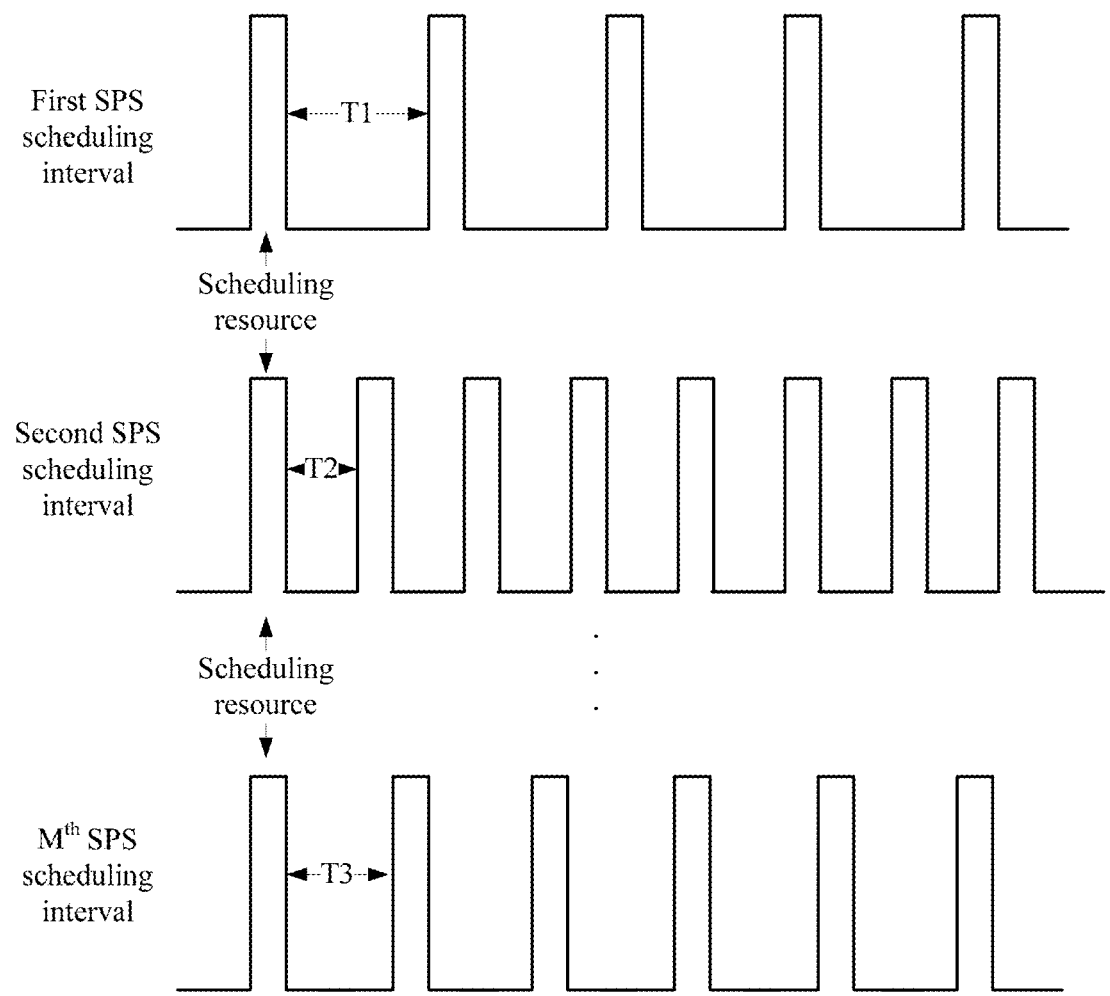
FIG. 7 is a schematic diagram of another SPS resource configuration according to an embodiment of the present invention.
Figure 8:
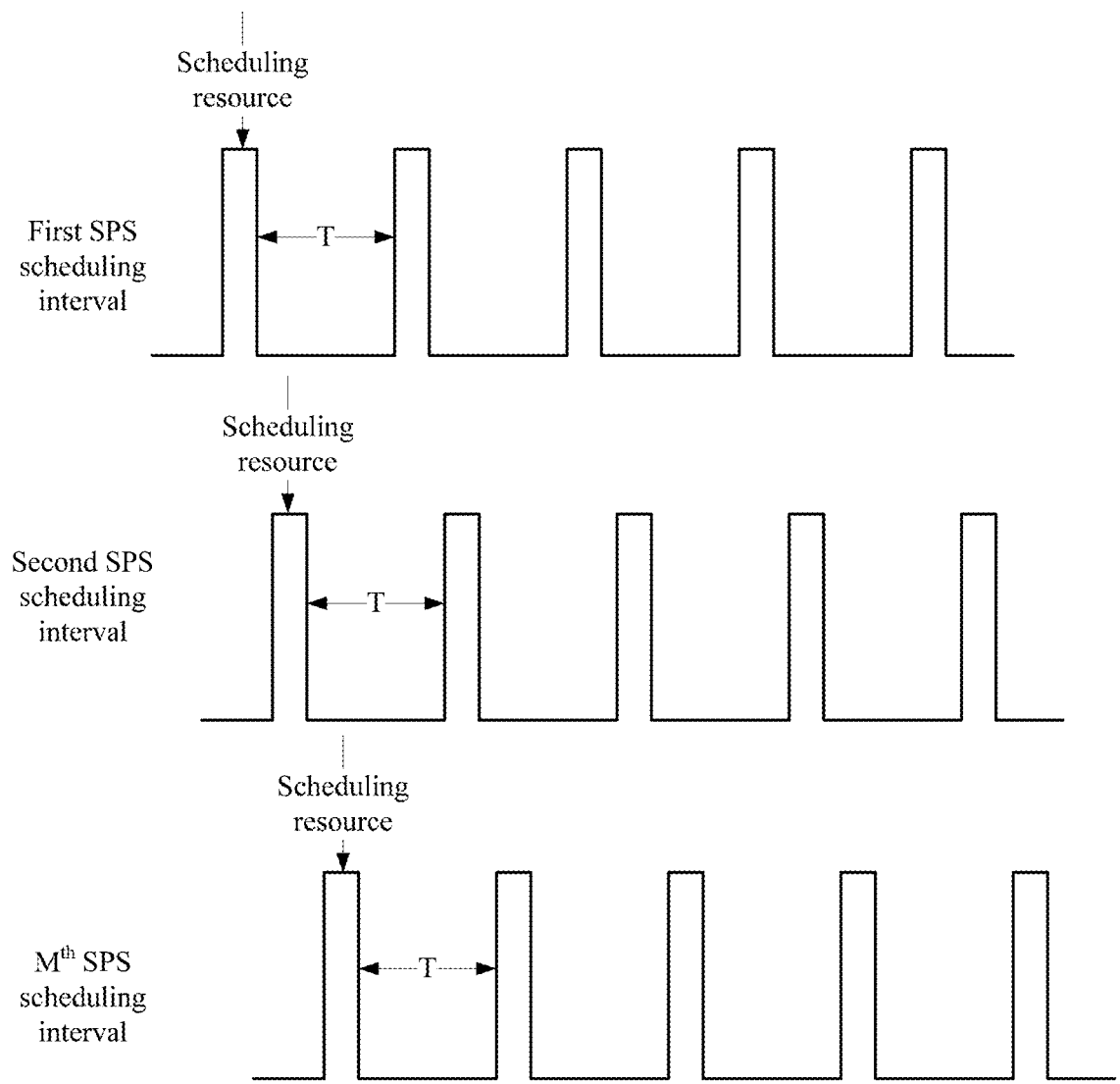
FIG. 8 is a schematic diagram of still another SPS resource configuration according to an embodiment of the present invention.

Specifically, for the type 2, the SPS resource configuration used by the second device may include M types of SPS scheduling intervals. All scheduling resources in each type of SPS scheduling interval are at an equal interval in time domain. Specifically, as shown in FIG. 7, time intervals of scheduling resources in different SPS scheduling intervals are different, for example, the time intervals are T1, T2, and T3. Alternatively, as shown in FIG. 8, time intervals of scheduling resources in all SPS scheduling intervals are the same and are all T, but the scheduling resources in all the SPS scheduling intervals are staggered in time domain.

The scheduling resource in the present invention is a resource available within one transmission time interval (TTI). The TTI may be a TTI of 1 ms, or a TTI having several symbols, for example, a short TTI having a length of two symbols, 0.5 ms, ¾ symbol, or the like. Alternatively, the scheduling resource in the present invention is a resource that can be used on a specified frequency domain subband within one TTI. The scheduling resource may be a resource in time domain or a resource in frequency domain.

It should be noted that V2X communication may be performed between the first device and the second device by using a scheduling resource in each of the scheduling intervals. The SPS in the present invention may be used between a network and a terminal. In this case, the second device is the network, and the first device is the terminal. For example, when the second device is an eNB, and the first device is UE, the PS resource configuration may include a downlink SPS resource (that is, when the second device needs to send downlink data to the first device), or may include an uplink SPS resource (that is, when the first device needs to send uplink data to the second device). The SPS described in the present invention may also be used between terminals. In this case, the first device is the terminal, and the second device is the network; or the first device is a first terminal, and the second device is a second terminal. For example, both the first device and the second device are UEs.

S102. The first device receives the SPS configuration information from the second device.

S103. The second device sends SPS activation information to the first device, where the SPS activation information is used to indicate an activated SPS resource to the first device, and the activated SPS resource is one or more SPS resources in the SPS resource configuration in step S101.

Corresponding to the SPS resource configuration, the activated SPS resource or a deactivated SPS resource in the present invention may also include a downlink SPS resource or an uplink SPS resource.

Figure 9:
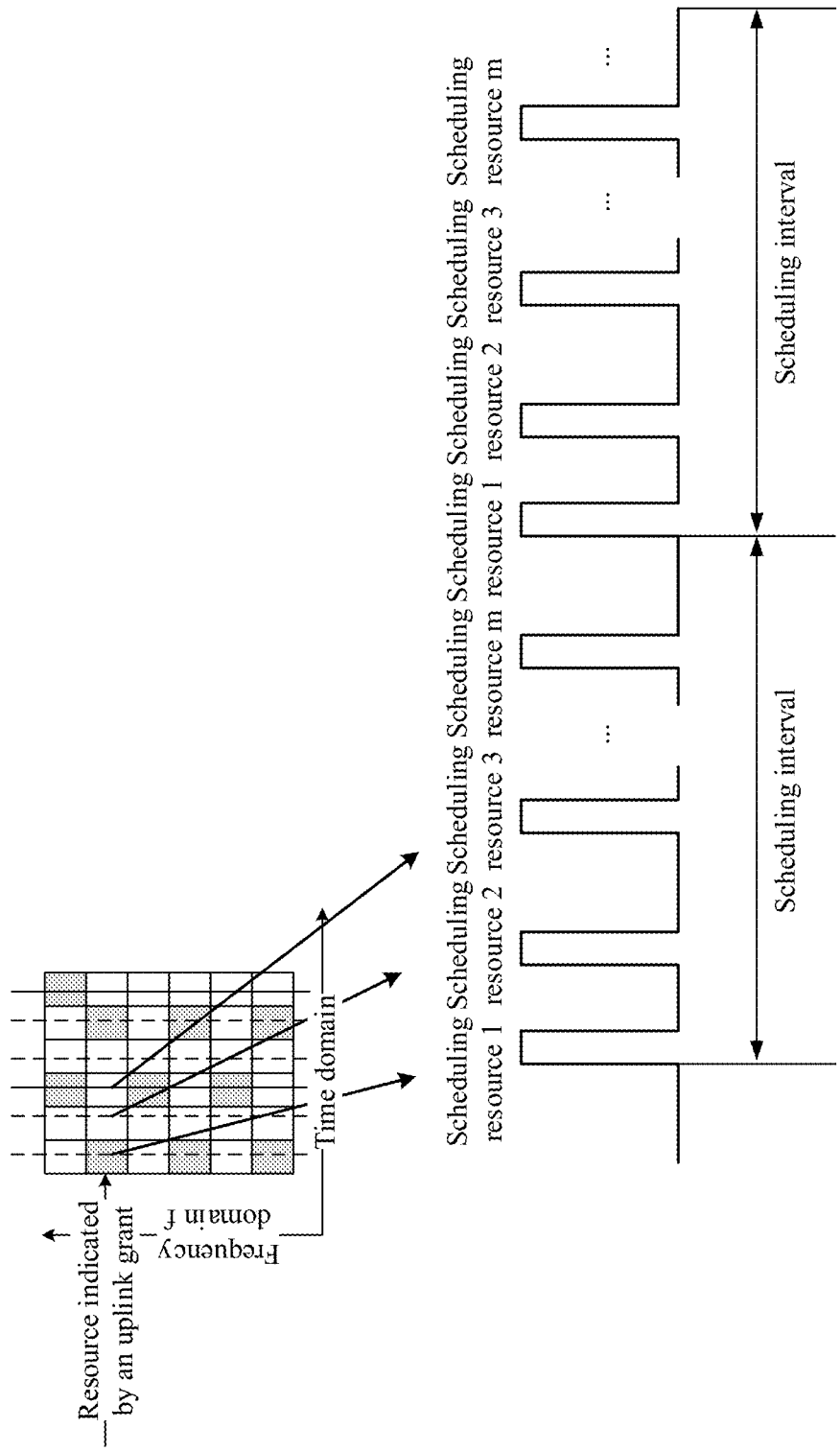
FIG. 9 is a schematic diagram of indicating a scheduling resource by using SPS activation information according to an embodiment of the present invention.

When the SPS resource configuration is the SPS scheduling interval with the m available scheduling resources (that is, when an SPS resource that needs to be activated is of the type 1), the second device may send the SPS activation information by using downlink control information (DCI) scrambled by using an semi-persistent scheduling cell radio network temporary identifier (SPS-CRNTI). In addition, the sent SPS activation information may indicate resource locations used by m scheduling resources in one scheduling interval, and specifically includes at least one or a combination of the following:

Optionally, the first device uses a uplink grant (UL grant) resource, which is determined in a current subframe based on DCI scrambled by using an SPS-CRNTI, as a resource occupied by m available scheduling resources in one scheduling interval. For example, as shown in FIG. 9, three resources indicated by an uplink grant UL grant are used as resources occupied by three scheduling resources (a scheduling resource 1, a scheduling resource 2, and a scheduling resource 3) in a scheduling interval.

Figure 10:
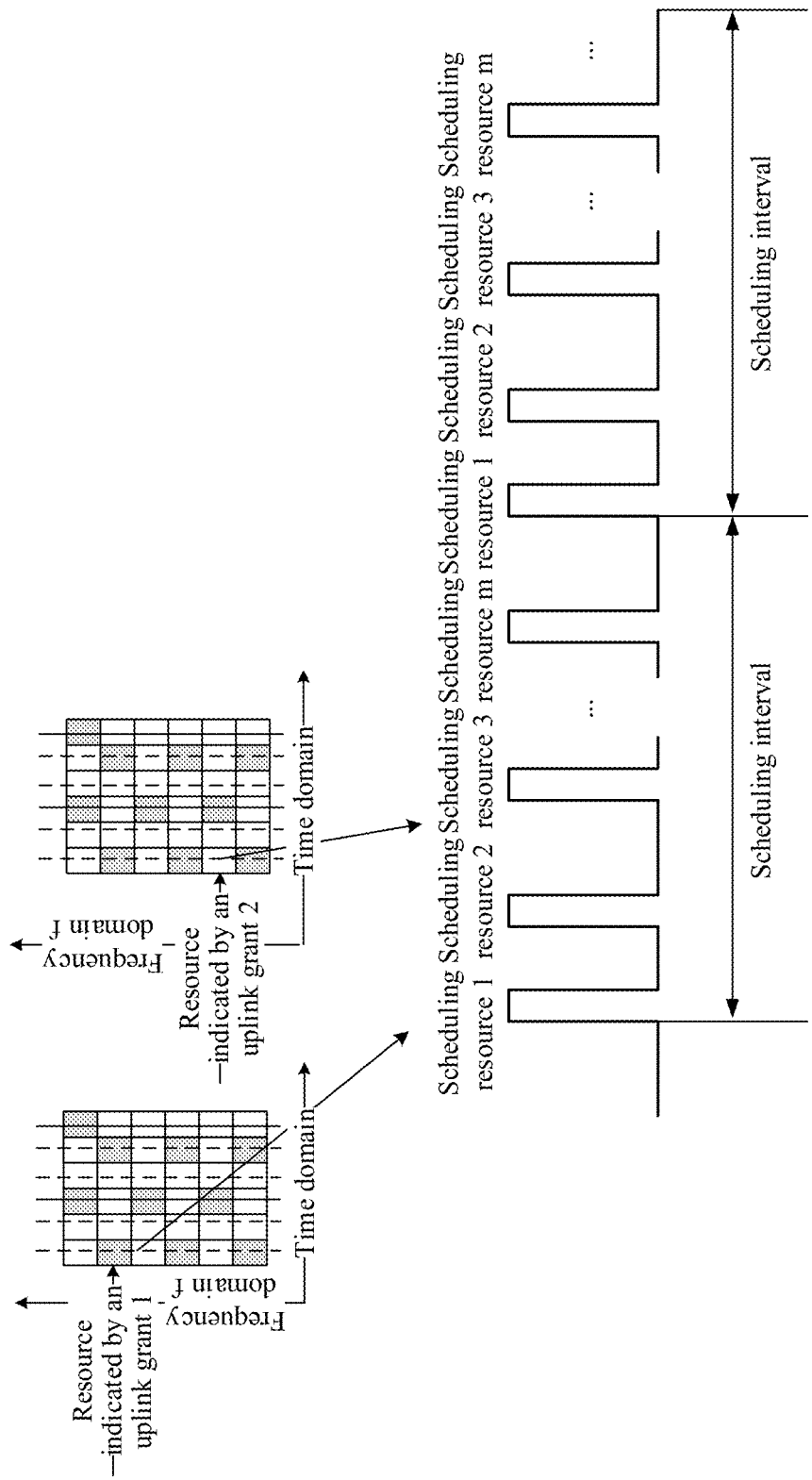
FIG. 10 is another schematic diagram of indicating a scheduling resource by using SPS activation information according to an embodiment of the present invention.

Optionally, the first device uses a UL grant resource, which is determined in a subframe before a subframe corresponding to an $i^{th}$ available scheduling resource in a scheduling interval or in a current subframe based on DCI scrambled by using an SPS-CRNTI, as a resource occupied by the $i^{th}$ available scheduling resource, where the $i^{th}$ available scheduling resource is one of the m available scheduling resources. For example, as shown in FIG. 10, a resource indicated by an uplink grant 1 may be used to indicate a resource occupied by a scheduling resource 1, and a resource indicated by an uplink grant 1 may be used to indicate a resource occupied by the scheduling resource 3.

Optionally, the first device uses DCI scrambled by using an SPS-CRNTI, to activate one or more of the m available scheduling resources.

Figure 11:
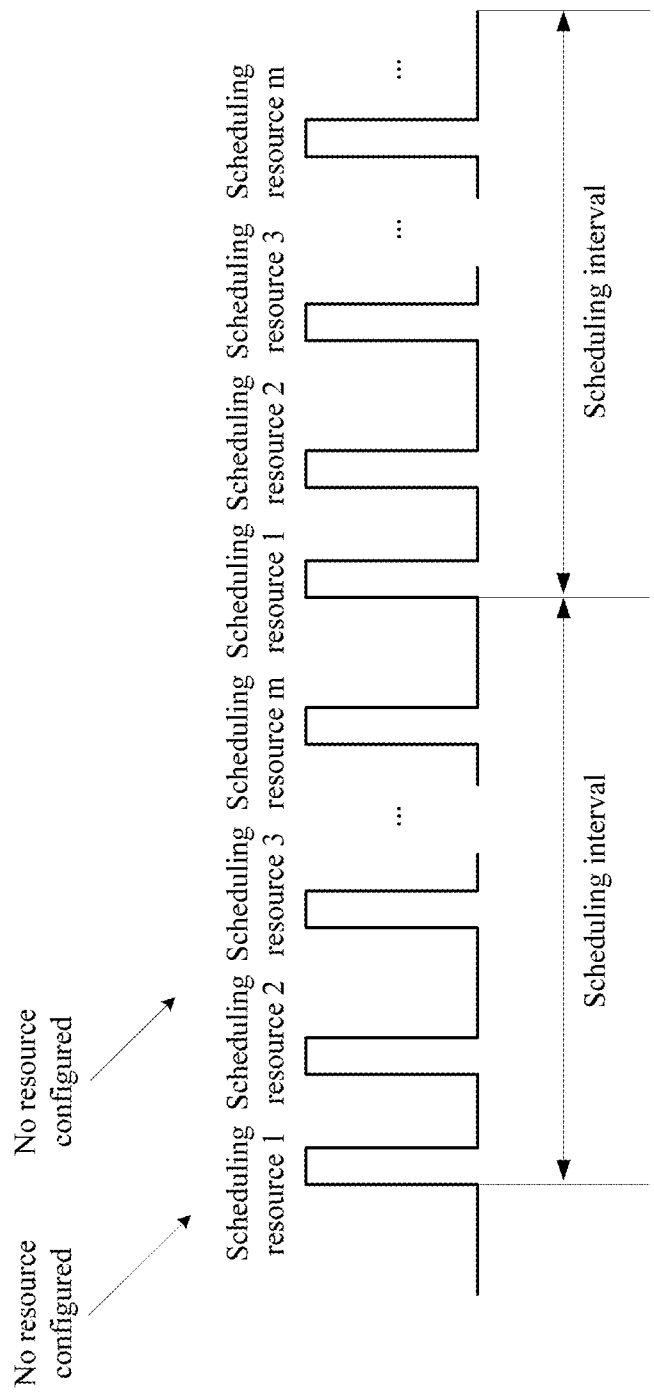
FIG. 11 is still another schematic diagram of indicating a scheduling resource by using SPS activation information according to an embodiment of the present invention.

For example, if UL grant information determined based on the DCI scrambled by using the SPS-CRNTI is not received before the $i^{th}$ available scheduling resource or in the current subframe, an available scheduling resource at the location may be not activated by default. For example, as shown in FIG. 11, no resource is configured for a scheduling resource 1 and a scheduling resource 3 in one scheduling interval, indicating that the scheduling resource 1 and the scheduling resource 3 are not activated.

When the SPS resource configuration is the M SPS scheduling intervals (that is, when an SPS resource that needs to be activated is of the type 2), one or more of the M scheduling intervals may be activated.

Figure 12:
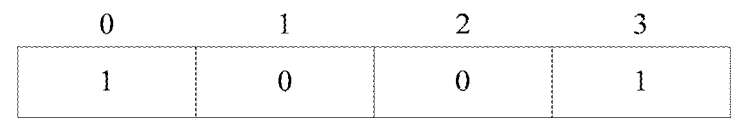

Optionally, M bits in a bitmap in the DCI are used to instruct to activate and/or deactivate one or more of the M SPS scheduling intervals. For example, one bit may correspond to an identifier of one SPS scheduling interval. A bit is set to 1 to indicate activating a corresponding SPS scheduling interval, and a bit is set to 0 to indicate not activating a corresponding SPS scheduling interval. Alternatively, a bit is set to 0 to indicate activating a corresponding SPS scheduling interval, and a bit is set to 1 to indicate not activating a corresponding SPS scheduling interval. For example, as shown in FIG. 12, FIG. 12 is a bitmap in DCI whose bits are 0 to 3 from left to right respectively, which represent a first SPS scheduling interval to a fourth SPS scheduling interval respectively. Assuming that 1 indicates activating a corresponding SPS scheduling interval and 0 indicates not activating a corresponding SPS scheduling interval, the bitmap in FIG. 12 indicates activating the first SPS scheduling interval and the fourth SPS scheduling interval, and not activating the second SPS scheduling interval and the third SPS scheduling interval.

Optionally, a time-frequency resource of the SPS activation information is used to instruct to activate and/or deactivate one of the M SPS scheduling intervals. For example, different time-frequency resources occupied for sending the SPS activation information are respectively mapped to identifiers of the M SPS scheduling intervals. In this case, when sending the SPS activation information on a particular time-frequency resource, the second device may instruct to activate and/or deactivate a corresponding SPS scheduling interval.

Optionally, content of the SPS activation information is used to instruct to activate and/or deactivate one or more of the M SPS scheduling intervals. For example, the SPS activation information clearly instructs to activate and/or deactivate one or more of the M SPS scheduling intervals.

It can be learned from above that the activation and deactivation described in the present invention mean activation or deactivation for one SPS resource, and mean activation and/or deactivation for a plurality of SPS resources.

S104. The first device receives the SPS activation information from the second device.

S105. The first device sends SPS instruction information to the second device, where the SPS instruction information is used to instruct to use or not to use a scheduling resource of the activated SPS resource.

Specifically, the first device determines the SPS instruction information based on the SPS activation information and a service requirement of a V2X service. The SPS instruction information instructs to use or not to use a scheduling resource of the activated SPS resource.

Optionally, when the SPS resource configuration is the SPS scheduling interval with the m available scheduling resources, the SPS instruction information is used to instruct to use or not to use consecutive scheduling resources of the m available scheduling resources within a time window.

Optionally, when the SPS resource configuration is the M SPS scheduling intervals, the SPS instruction information instructs to use or not to use scheduling resources in N SPS scheduling intervals of the M SPS scheduling intervals, where N≤M, and the scheduling resources may be consecutive or inconsecutive.

Figure 13:
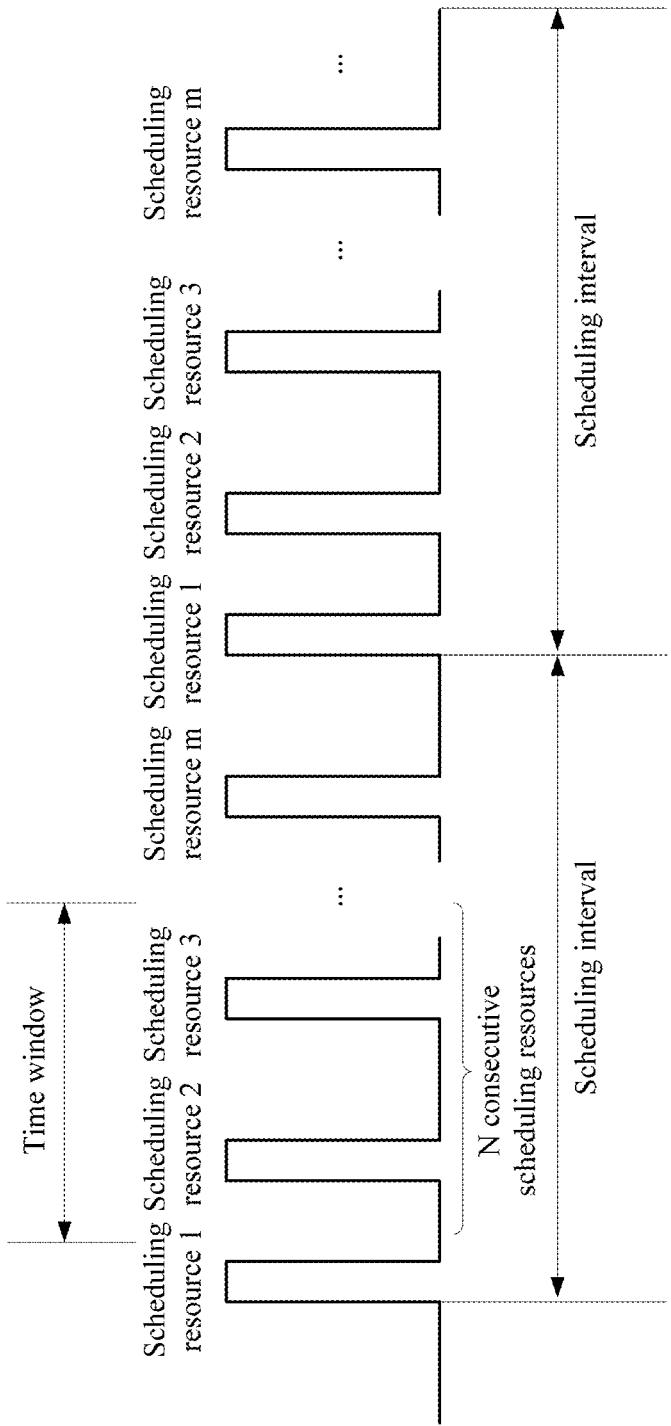
FIG. 13 is a schematic diagram of consecutive scheduling resources within a time window according to an embodiment of the present invention.
Figure 14:
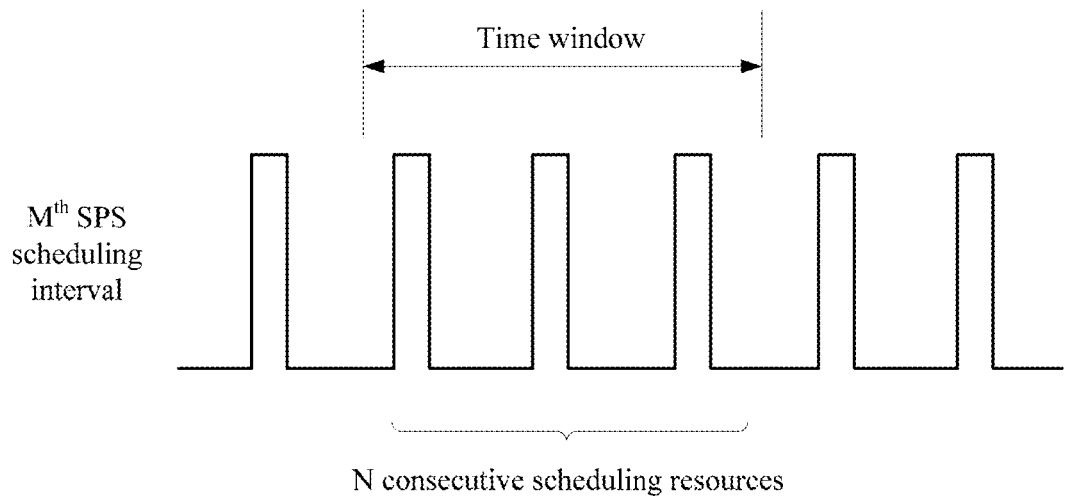
FIG. 14 is a schematic diagram of consecutive scheduling resources within another time window according to an embodiment of the present invention.

Further, optionally, when the SPS resource configuration is M SPS scheduling intervals, the SPS instruction information instructs to use or not to use consecutive scheduling resources in N SPS scheduling intervals of the M SPS scheduling intervals within a time window, where N≤M. The SPS instruction information may be specific to m scheduling resources in an SPS scheduling interval in the type 1, as shown in FIG. 13, or specific to all scheduling resources in each SPS scheduling interval in the type 2, as shown in FIG. 14. The first device needs to select consecutive scheduling resources from the SPS resource indicated in the SPS activation information for subsequent V2X service transmission, to meet a service requirement of a V2X service.

The time window herein may be a timer, and may be sent by the first device to the second device or sent by the second device to the first device. In addition, the SPS instruction information may indicate N consecutive scheduling resources in a binding manner. For example, the bit 1 is used to instruct to use or not to use N consecutive scheduling resources starting from a nearest scheduling resource, or the bit 11 is used to instruct to use or not to use two or more consecutive scheduling resources starting from a nearest scheduling resource.

It should be noted that when the second device is an eNB and the first device is UE, the activated or deactivated scheduling resource may be a downlink SPS resource, or may be an uplink SPS resource; or when both the first device and the second device are UEs, the activated scheduling resource may be a sidelink SPS resource for sidelink.

Specifically, the SPS instruction information is sent by using physical layer signaling.

S106. The second device receives the SPS instruction information from the first device.

After receiving the SPS instruction information, the second device determines, based on the SPS instruction information, a scheduling resource, of an activated SPS resource, that is or is not used by the first device, and may use an SPS resource that is not used by the first device, for downlink SPS transmission, or may allocate an SPS resource that is not used by the first device to another device for data transmission.

Figure 15:
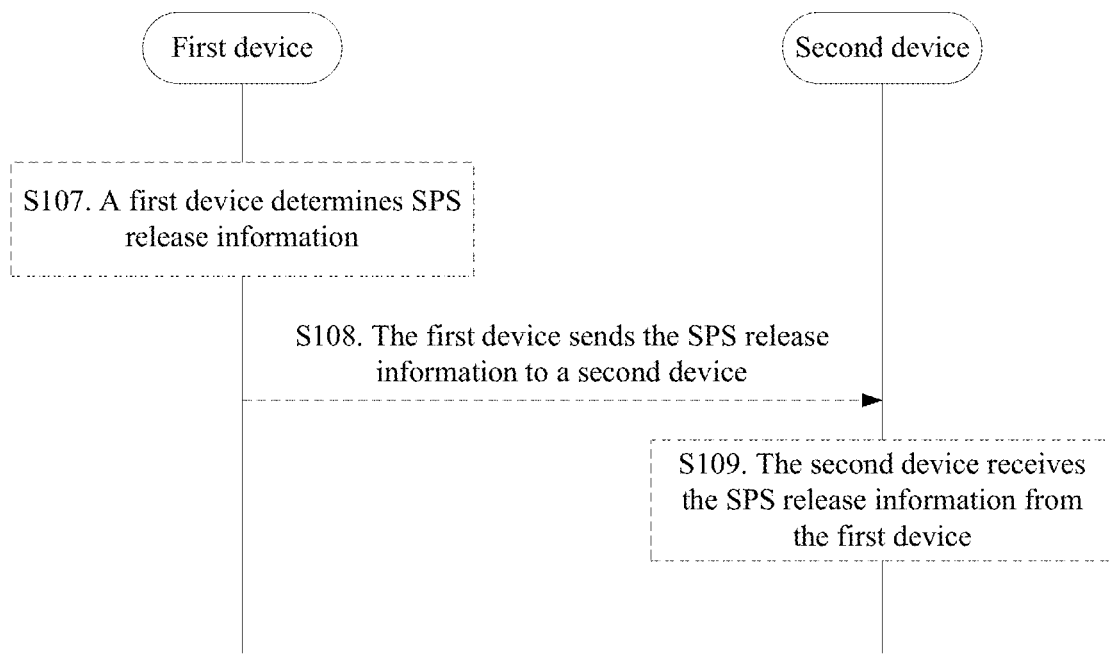
FIG. 15 is a schematic flowchart of another scheduling method according to an embodiment of the present invention.

Optionally, referring to FIG. 15, the scheduling method provided in the present invention may further include steps S107 to S109.

S107. The first device determines SPS release information, where the SPS release information is used to instruct to release some or all scheduling resources of the activated SPS resource.

Specifically, the first device determines the SPS release information based on the SPS activation information and a service requirement of a V2X service.

To save uplink SPS scheduling resources, the first device may proactively release an uplink SPS scheduling resource.

For example, the SPS release information may be radio resource control (RRC) layer signaling, Medium Access Control (MAC) layer signaling, or PHY (English full name: physical) layer signaling. The SPS release information may be combined signaling of various layers.

Figure 16:
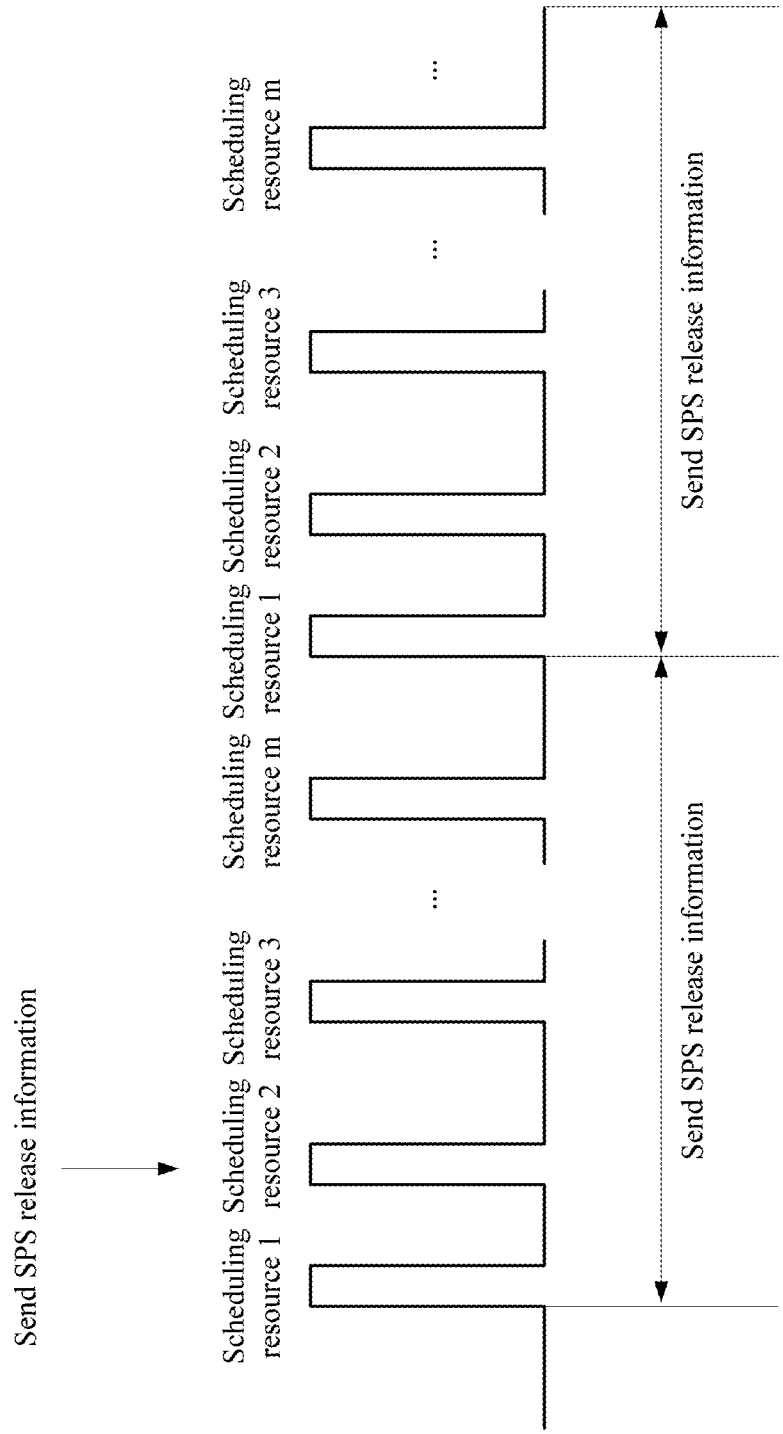
FIG. 16 is a schematic diagram of instructing, by using SPS release information, to release a scheduling resource according to an embodiment of the present invention.

Optionally, for the type 1, that is, when the SPS resource configuration is an SPS scheduling interval with m available scheduling resources, the first device sends the SPS release information in a subframe or a short subframe before any scheduling resource of the m available scheduling resources in an SPS scheduling interval, to instruct to release the any scheduling resource. Referring to FIG. 16, for example, when the SPS release information is sent on a scheduling resource 2 in a scheduling interval, it indicates that the scheduling resource 2 is released.

Optionally, for the type 2, that is, when the SPS resource configuration is M SPS scheduling intervals, the first device instructs, in uplink control information (UCI), to release one or more SPS scheduling intervals in the activated SPS resource. Specifically, an identifier of an SPS scheduling interval may be used to indicate a specific SPS scheduling interval.

S108. The first device sends the SPS release information to the second device.

S109. The second device receives the SPS release information from the first device.

The second device determines, based on the SPS release information, that the first device releases a scheduling resource of the activated SPS resource, and may use the SPS resource released by the first device for downlink SPS transmission, or allocate the SPS resource released by the first device to another device for data transmission.

Figure 17:
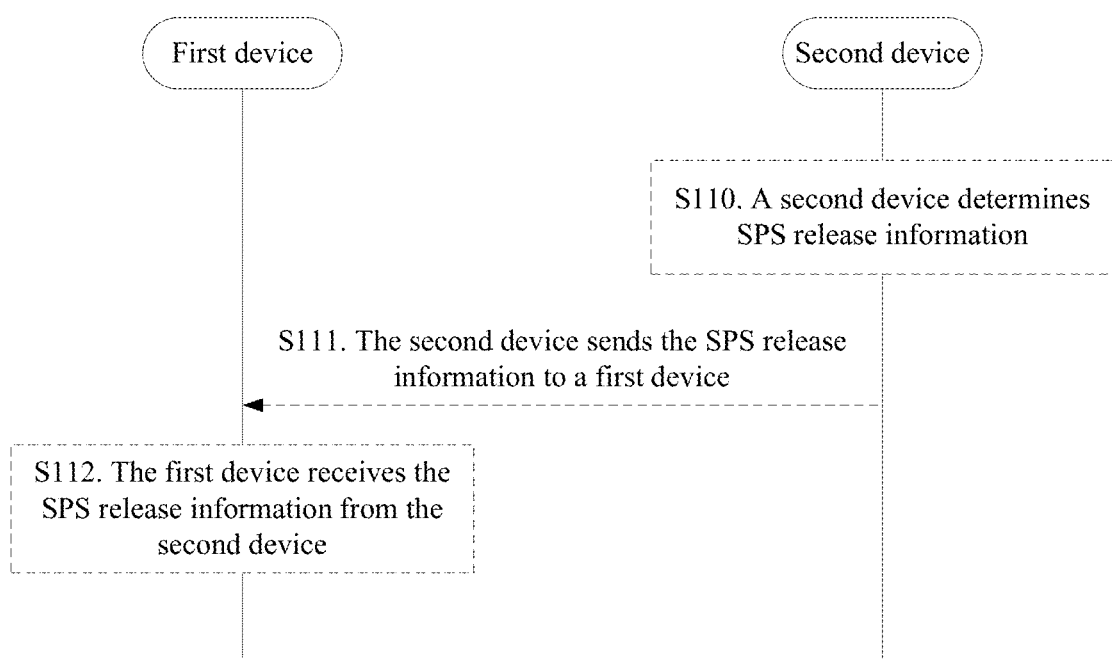
FIG. 17 is a schematic flowchart of another scheduling method according to an embodiment of the present invention.

Optionally, referring to FIG. 17, the scheduling method provided in the present invention may further include steps S110 to S112.

S110. The second device determines SPS release information, where the SPS release information instructs to release some or all scheduling resources of the activated SPS resource.

Specifically, the second device determines the SPS release information based on the SPS activation information and a service requirement of a V2X service. For an SPS release information indication process, refer to step S111.

S111. The second device sends the SPS release information to the first device, where the SPS release information is determined by the second device based on the SPS activation information and a service requirement of a V2X service, and the SPS release information instructs to release a scheduling resource of the activated SPS resource.

Optionally, for the type 2, that is, when the SPS resource configuration is M SPS scheduling intervals, the second device instructs, by using a hybrid automatic repeat request (HARQ) identifier in DCI, to release an SPS resource of the activated SPS resource.

Optionally, for the type 2, the second device sends the SPS release information on any scheduling resource of the activated SPS resource, to instruct to release all SPS scheduling resources corresponding to the any scheduling resource.

S112. The first device receives the SPS release information from the second device.

The first device determines, based on the SPS release information, that the second device releases a scheduling resource of the activated SPS resource, and may use the SPS resource released by the second device for downlink SPS transmission, or allocate the SPS resource released by the second device to another device for data transmission.

According to the scheduling method provided in the present invention, the second device sends the SPS configuration information to the first device, where the SPS configuration information indicates the SPS resource configured by the second device; the first device receives the SPS configuration information from the second device; the second device sends the SPS activation information to the first device, where the SPS activation information is used to indicate the activated SPS resource to the first device, and the activated SPS resource is one or more of SPS resources in the configured SPS resource; the first device receives the SPS activation information from the second device; the first device sends the SPS instruction information to the second device, where the SPS instruction information is used to instruct to use or not to use a scheduling resource of the activated SPS resource; the second device receives the SPS instruction information from the first device; and after receiving the SPS instruction information, the second device determines, based on the SPS instruction information or the SPS release information, the SPS resource that is not used by the first device, and uses the SPS resource that is not used by the first device, for downlink SPS transmission, or allocates the SPS resource that is not used by the first device to another device for data transmission. In the present invention, the second device configures different SPS resources for the first device and activates one or more of the SPS resources for the first device, the first device selects, from the one or more of the SPS resources based on the activated SPS resource or resources and a service requirement of a service, an SPS resource that meets the service requirement of the service, and the second device allocates an SPS resource that is not used by the first device to another device. This maximizes scheduling resource utilization, and resolves a problem that a scheduling resource is wasted when SPS transmission with a relatively short scheduling interval is applied to the V2X service.

Figure 18:
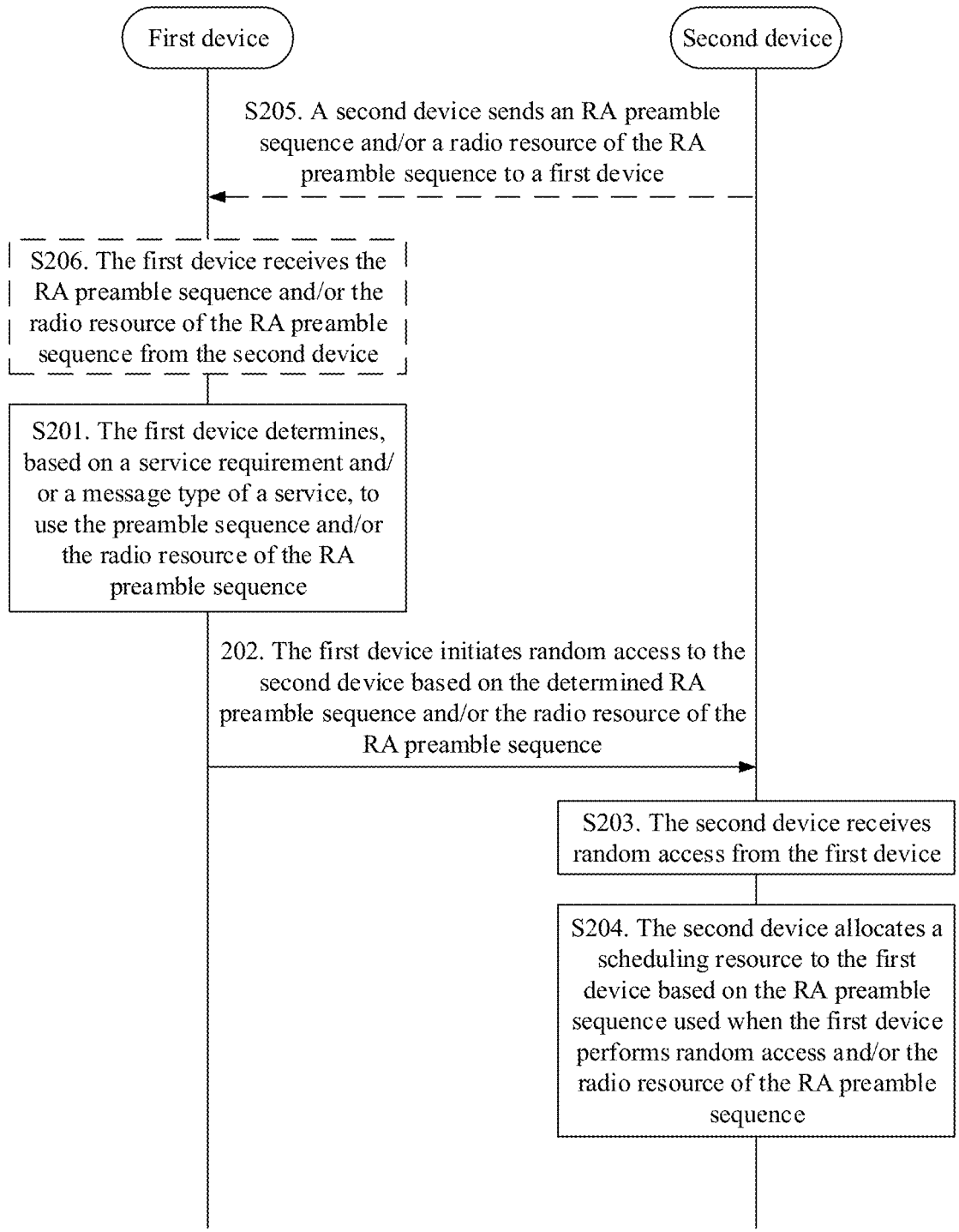
FIG. 18 is a schematic flowchart of another scheduling method according to an embodiment of the present invention.

The present invention provides a scheduling method that is applied to a V2X communications system in FIG. 1. Referring to FIG. 18, the method includes the following steps.

S201. A first device determines, based on a service requirement and/or a message type of a service, to use an random access (RA) preamble sequence and/or a radio resource of the RA preamble sequence, where the RA preamble sequence and/or the radio resource of the RA preamble sequence indicate/indicates a service requirement and/or a message type of data of the first device. To be specific, the RA preamble sequence and/or the radio resource of the RA preamble sequence indicate/indicates the service requirement of the data of the first device; the RA preamble sequence and/or the radio resource of the RA preamble sequence indicate/indicates the message type of the data of the first device; and the RA preamble sequence and/or the radio resource of the RA preamble sequence indicate/indicates the service requirement and the message type of the data of the first device.

Optionally, the RA preamble sequence includes a specified preamble sequence separated from an existing RA preamble sequence or a preamble sequence obtained by extending an existing RA preamble sequence.

The radio resource of the RA preamble sequence is a radio resource occupied when the first device initiates random access by using an RA preamble sequence.

The service requirement of the data of the first device is a service requirement of a bearer carrying the data, or a service requirement of a service carrying the data. There are a plurality of RA preamble sequences. Each RA preamble sequence may be mapped to one service requirement or one message type of the data of the first device, so that a data sending emergency level of the first device is determined, and the first device matches a version of a V2X service. Similarly, there are also a plurality of radio resources of an RA preamble sequence. Each radio resource may be mapped to one service requirement or one message type of the data of the first device, so that a data sending emergency level of the first device is determined, and the first device matches a version of a V2X service.

In the present invention, the service may include a V2X service, and the service requirement of the service may include a service requirement of the V2X service.

Optionally, the service requirement may include a time requirement and/or a rate requirement.

Optionally, when there is a V2X service, or when the first device finds, through calculation, that an scheduling request (SR) cannot meet a service requirement or a message type of a V2X service, the first device determines, based on the service requirement or the message type of the V2X service, to use one RA preamble sequence and/or one radio resource of the RA preamble sequence, and initiates random access to a second device based on the determined RA preamble sequence and/or the radio resource of the RA preamble sequence, so as to quickly obtain a scheduling resource from the second device.

The message type of the V2X service also indicates an emergency level of the V2X service, and is also one type of service requirement.

S202. The first device initiates random access to a second device based on the determined RA preamble sequence and/or the radio resource of the RA preamble sequence.

The first device initiates random access to the second device by using one RA preamble sequence and/or one radio resource of the RA preamble sequence, that is, the first device sends a request to the second device for use of a corresponding scheduling resource, to meet a service requirement or a message type of the V2X service.

S203. The second device receives random access from the first device.

S204. The second device allocates a scheduling resource to the first device based on the RA preamble sequence used when the first device performs random access and/or the radio resource of the RA preamble sequence.

Optionally, referring to FIG. 18, before step S201, the method may further include steps S205 and S206.

S205. The second device sends the RA preamble sequence and/or the radio resource of the RA preamble sequence to the first device.

S206. The first device receives the RA preamble sequence and/or the radio resource of the RA preamble sequence from the second device.

Optionally, the second device may send, through broadcasting or signaling, the RA preamble sequence and/or the radio resource of the RA preamble sequence. Alternatively, optionally, the second device may locally store the RA preamble sequence and/or the radio resource of the RA preamble sequence. This is not limited in the present invention.

According to the scheduling method provided in the present invention, the first device determines, based on the service requirement or the message type of the service, to use the RA preamble sequence and/or the radio resource of the RA preamble sequence, where the RA preamble sequence and/or the radio resource of the RA preamble sequence indicate/indicates the service requirement and/or the message type of the data of the first device; the first device initiates random access to the first device based on the determined RA preamble sequence and/or the radio resource of the RA preamble sequence; the second device receives random access from the first device; and the second device allocates the scheduling resource to the first device based on the RA preamble sequence used when the first device performs random access and/or the radio resource of the RA preamble sequence. The RA preamble sequence and/or the radio resource of the RA preamble sequence are mapped to a service requirement or a service type of a V2X service, so that the first device selects a proper RA preamble sequence and/or a proper radio resource of the RA preamble sequence accordingly to initiate random access, and the second device allocates the scheduling resource to the first device accordingly. This resolves a problem that a service requirement cannot be met when the V2X service is performed.

Figure 19:
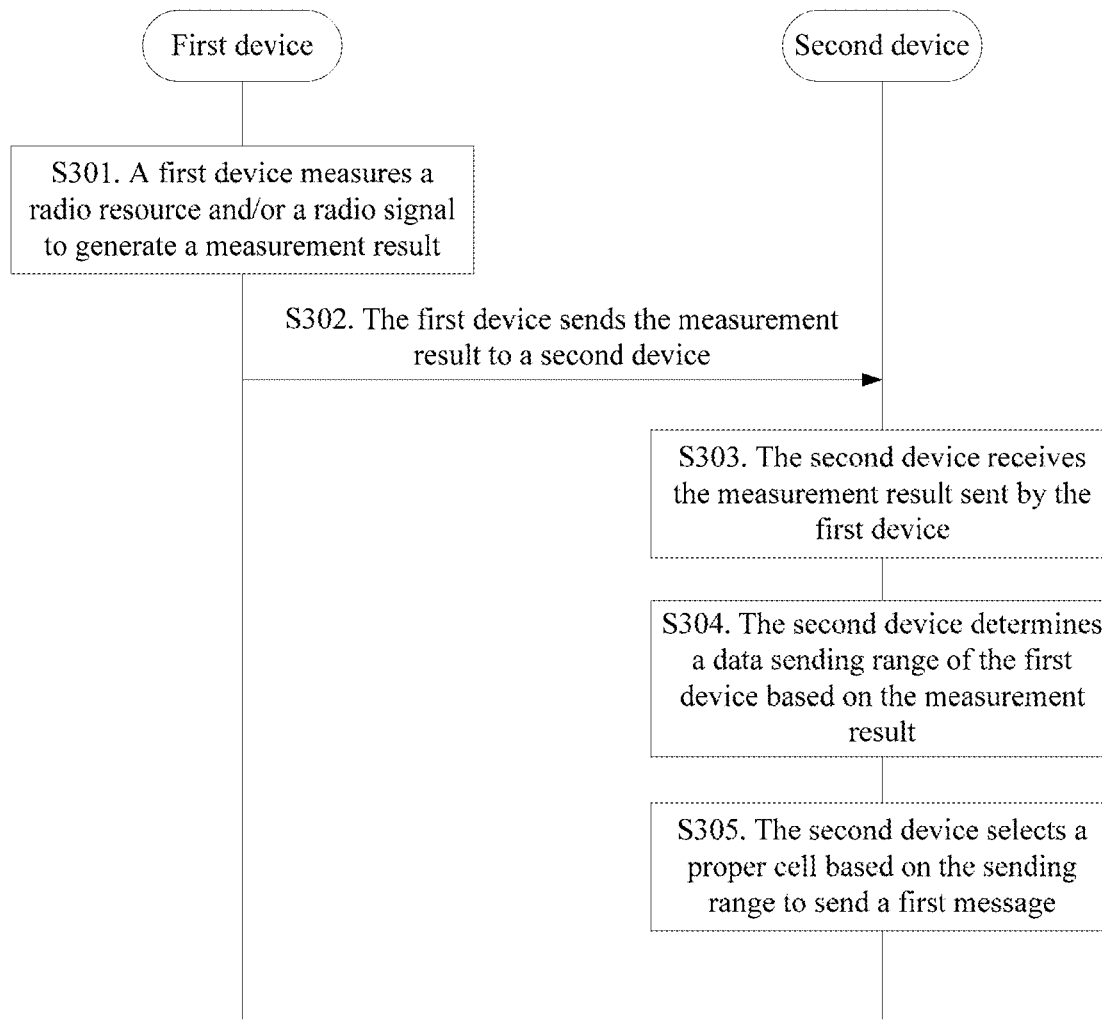
FIG. 19 is a schematic flowchart of still another scheduling method according to an embodiment of the present invention.

The present invention provides a scheduling method that is applied to a V2X communications system in FIG. 1. Referring to FIG. 19, the method includes the following steps.

S301. A first device measures a radio resource and/or a radio signal to generate a measurement result, where the measurement result is used to instruct a second device to determine a data sending range of the first device and select a proper cell based on the sending range to send a first message.

For example, the first message may be one of the following messages: a V2X message, a wearable service message, an narrowband Internet of Things (NB-IoT) service message, and a broadband service message.

Optionally, the measurement result includes a measurement result of a specified cell. Further, optionally, the measurement result includes a measurement result, of a specified cell, that meets the following condition: the measurement result is lower than a first threshold and/or lower than a measurement result of the first threshold and a first offset value.

Optionally, the measurement result may further include mobility information of the first device. Further, optionally, the mobility information may include cell-related time information and at least one of the following cell information: a cell that the first device has passed through, is passing through, or is to pass through. Optionally, the cell is a cell in which there is a V2X service. For example, the cell-related time information may include, for example, camp-on duration in a cell or a time required for passing through several cells.

Optionally, the mobility information of the first device may further include V2X message type information and/or V2X message sending distance information of the first device.

S302. The first device sends the measurement result to the second device.

Optionally, when the measurement result is the measurement result of the specified cell in step S301, the first device sends the measurement result of the specified cell to the second device before a V2X service is started; or the first device sends the measurement result of the specified cell to the second device after a V2X service is started.

Optionally, when the measurement result is mobility information of the first device in step S301, the first device may send the mobility information of the first device in a UU-sidelink conversion process.

Optionally, the first device may send the measurement result in step S301 and/or location information of the first device to the second device. Mobility information of the first device may include V2X message type information and/or V2X message sending distance information of the first device.

Further, optionally, when at least one of the following conditions is met, the first device may send the measurement result in step S301 and/or location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

The signal may be a cell-specific reference signal (CRS), a demodulation reference signal (DM-RS), a channel status information reference signal, channel state information reference signal (CSI-RS), or a positioning reference signal (PRS).

Further, optionally, when the foregoing condition is met, the first device may periodically send the measurement result and/or the location information of the first device to the second device.

Optionally, when the mobility information of the first device in step S301 is V2X message type information and/or V2X message sending distance information of the first device, the first device sends the V2X message type information and/or the V2X message sending distance information of the first device to the second device by using one or a combination of an RRC layer, a MAC layer, and a PHY layer.

S303. The second device receives the measurement result sent by the first device.

S304. The second device determines the data sending range of the first device based on the measurement result.

S305. The second device selects a proper cell based on the sending range to send the first message.

According to the scheduling method provided in the present invention, the first device measures the radio resource and/or the radio signal to generate the measurement result, where the measurement result is used to instruct the second device to determine the data sending range of the first device and selects the proper cell based on the sending range to send the first message; the first device sends the measurement result to the second device; the second device receives the measurement result sent by the first device; and the second device determines the data sending range of the first device based on the measurement result and selects the proper cell based on the sending range to send the first message. The first device sends, to the second device, the measurement result indicating the data sending range, so that the second device determines the data sending range and selects the proper cell based on the data sending range to send the first message. This resolves a problem that the second device cannot obtain the data sending range from the first device.

Figure 20:
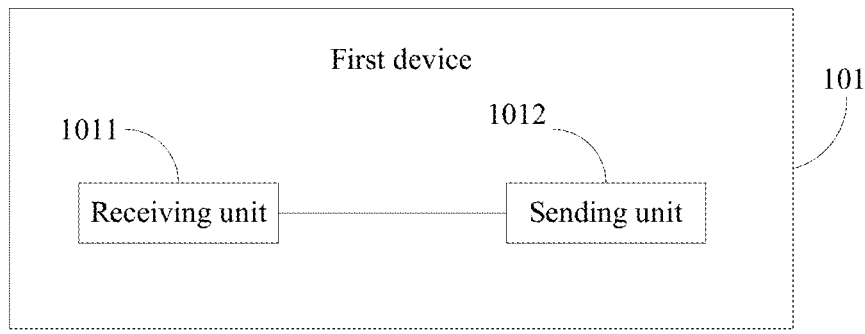
FIG. 20 is a schematic structural diagram of a first device according to an embodiment of the present invention.

The present invention provides a first device. The first device may be the first device 101 in FIG. 4 and is applied to the scheduling methods in FIG. 5, FIG. 15, and FIG. 17. As shown in FIG. 20, the first device includes:

a receiving unit 1011, configured to receive semi-persistent scheduling SPS configuration information from a second device, where the SPS configuration information is used to indicate an SPS resource configuration used by the second device; and the receiving unit 1011 is further configured to receive SPS activation information from the second device, where the SPS activation information is used to indicate an activated SPS resource, and the activated SPS resource is one or more SPS resources in the SPS resource configuration; and a sending unit 1012, configured to send SPS instruction information to the second device, where the SPS instruction information is used to instruct to use or not to use a scheduling resource of the activated SPS resource.

The first device in this embodiment of the present invention may be configured to perform the method procedures shown in FIG. 5, FIG. 15, and FIG. 17. Therefore, for technical effects that can be obtained by the first device, refer to the method embodiments shown in FIG. 5, FIG. 15, and FIG. 17, and details are not repeated in this embodiment of the present invention.

An example is provided. The SPS resource configuration includes at least one or a combination of the following:

an SPS scheduling interval with m available scheduling resources; or

M SPS scheduling intervals.

Figure 21:
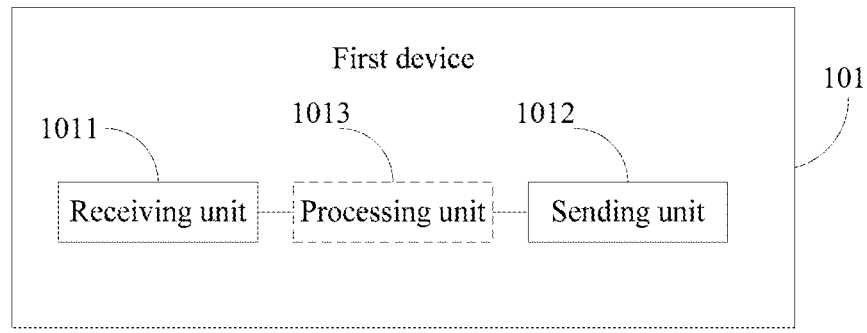
FIG. 21 is a schematic structural diagram of another first device according to an embodiment of the present invention.

An example is provided. Optionally, referring to FIG. 21, the first device further includes a processing unit 1013, configured to: when the SPS resource configuration is the SPS scheduling interval with the m available scheduling resources, perform at least one or a combination of the following operations:

using a UL grant resource, which is determined in a current subframe based on DCI scrambled by using the SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using the SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

An example is provided. When the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

An example is provided. That the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

An example is provided. The time window is sent by the sending unit 1012 to the second device; or the time window is sent by the second device to the receiving unit 1011.

An example is provided. The processing unit 1013 is further configured to determine SPS release information, where the SPS release information is used to instruct to release some or all scheduling resources of the activated SPS resource.

The sending unit 1012 is further configured to send the SPS release information to the second device.

An example is provided. That the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI is used to instruct to release one or more SPS scheduling intervals of the activated SPS resource.

An example is provided. The receiving unit 1011 is further configured to receive SPS release information from the second device, where the SPS release information is used to instruct to release some or all scheduling resources of the activated SPS resource.

An example is provided. When the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

An example is provided. The SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

An example is provided. The SPS is used between a network and a terminal or between terminals.

It should be noted that the processing unit 1013 may be an independently disposed processor, or may be integrated into a processor of the first device, or may be stored in a memory of the first device in a form of program code to be invoked by a processor of the first device to perform the foregoing functions of the processing unit. The processor herein may be a central processing unit (CPU), an application-specific integrated circuit (ASIC), or one or more integrated circuits configured to implement this embodiment of the present invention.

The first device in this embodiment of the present invention may be configured to perform the method procedures shown in FIG. 5, FIG. 15, and FIG. 17. Therefore, for technical effects that can be obtained by the first device, refer to the method embodiments shown in FIG. 5, FIG. 15, and FIG. 17, and details are not repeated in this embodiment of the present invention.

Figure 22:
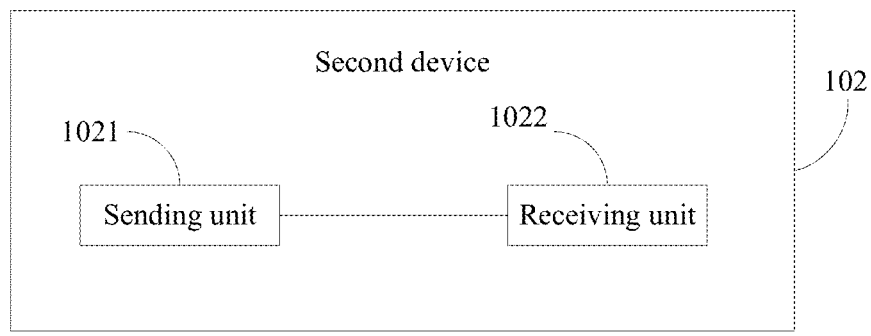
FIG. 22 is a schematic structural diagram of a second device according to an embodiment of the present invention.

The present invention provides a second device. The second device may be the second device 102 in FIG. 4 and is applied to the scheduling methods in FIG. 5, FIG. 15, and FIG. 17. As shown in FIG. 22, the second device includes:

a sending unit 1021, configured to send semi-persistent scheduling SPS configuration information to a first device, where the SPS configuration information is used to indicate an SPS resource configuration used by the second device; and the sending unit 1021 is further configured to send SPS activation information to the first device, where the SPS activation information is used to indicate an activated SPS resource, and the activated SPS resource is one or more SPS resources in the SPS resource configuration; and a receiving unit 1022, configured to receive SPS instruction information from the first device, where the SPS instruction information is used to instruct to use or not to use a scheduling resource of the activated SPS resource.

The second device in this embodiment of the present invention may be configured to perform the method procedures shown in FIG. 5, FIG. 15, and FIG. 17. Therefore, for technical effects that can be obtained by the second device, refer to the method embodiments shown in FIG. 5, FIG. 15, and FIG. 17, and details are not repeated in this embodiment of the present invention.

An example is provided. The SPS resource configuration includes at least one or a combination of the following:

an SPS scheduling interval with m available scheduling resources; or

M SPS scheduling intervals.

Figure 23:
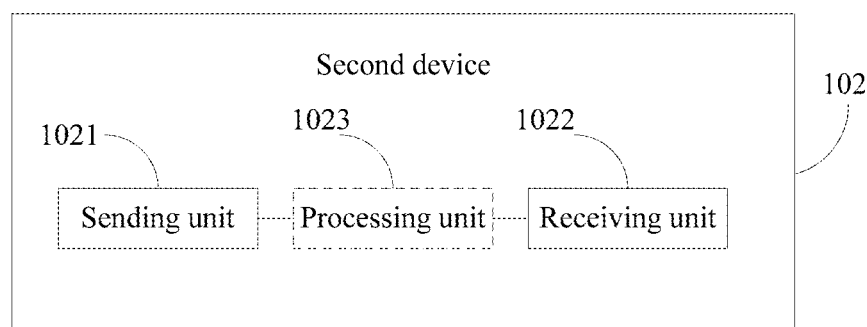
FIG. 23 is a schematic structural diagram of another second device according to an embodiment of the present invention.

An example is provided. Optionally, referring to FIG. 23, the second device further includes a processing unit 1023, configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using the SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

An example is provided. When the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

An example is provided. That the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

An example is provided. The time window is sent by the sending unit 1021 to the second device; or the time window is sent by the second device to the receiving unit 1022.

An example is provided. The receiving unit 1022 is further configured to receive SPS release information from the first device, where the SPS release information is used to instruct to release some or all scheduling resources of the activated SPS resource.

An example is provided. That the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI instructs to release one or more SPS scheduling intervals of the activated SPS resource.

An example is provided. The processing unit 1023 is further configured to determine SPS release information, where the SPS release information is used to instruct to release some or all scheduling resources of the activated SPS resource.

The sending unit 1021 is further configured to send the SPS release information to the first device.

An example is provided. When the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

An example is provided. The SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

An example is provided. The SPS is used between a network and a terminal or between terminals.

It should be noted that the processing unit 1023 may be an independently disposed processor, or may be integrated into a processor of the second device, or may be stored in a memory of the second device in a form of program code to be invoked by a processor of the second device to perform the foregoing functions of the processing unit. The processor herein may be a central processing unit (CPU), an application-specific integrated circuit (ASIC), or one or more integrated circuits configured to implement this embodiment of the present invention.

The second device in this embodiment of the present invention may be configured to perform the method procedures shown in FIG. 5, FIG. 15, and FIG. 17. Therefore, for technical effects that can be obtained by the second device, refer to the method embodiments shown in FIG. 5, FIG. 15, and FIG. 17, and details are not repeated in this embodiment of the present invention.

Figure 24:
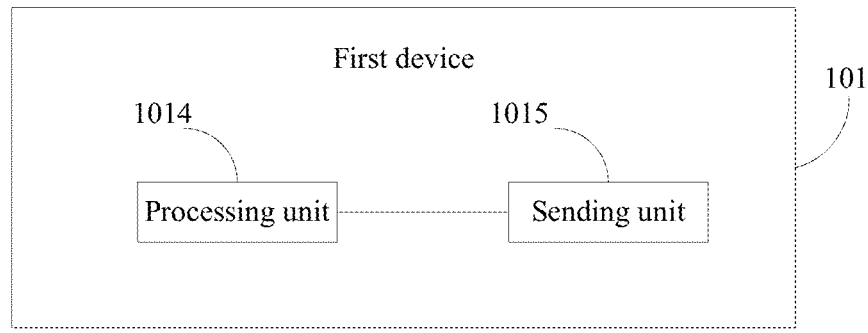
FIG. 24 is a schematic structural diagram of a first device according to an embodiment of the present invention.

The present invention provides a first device. The first device may be the first device 101 in FIG. 4 and is applied to the scheduling method in FIG. 18 and vehicle-to-everything V2X communication. As shown in FIG. 24, the first device includes:

a processing unit 1014, configured to determine, based on a service requirement and/or a message type of a service, to use a random access RA preamble sequence and/or a radio resource of the RA preamble sequence, where the RA preamble sequence and/or the radio resource of the RA preamble sequence are/is used to indicate a service requirement and/or a message type of data of the first device; and a sending unit 1015, configured to initiate random access to a second device based on the determined RA preamble sequence and/or the radio resource of the RA preamble sequence.

The first device in this embodiment of the present invention may be configured to perform the method procedure shown in FIG. 18. Therefore, for technical effects that can be obtained by the first device, refer to the method embodiment shown in FIG. 18, and details are not repeated in this embodiment of the present invention.

An example is provided. The service requirement further includes a time requirement and/or a rate requirement.

Figure 25:
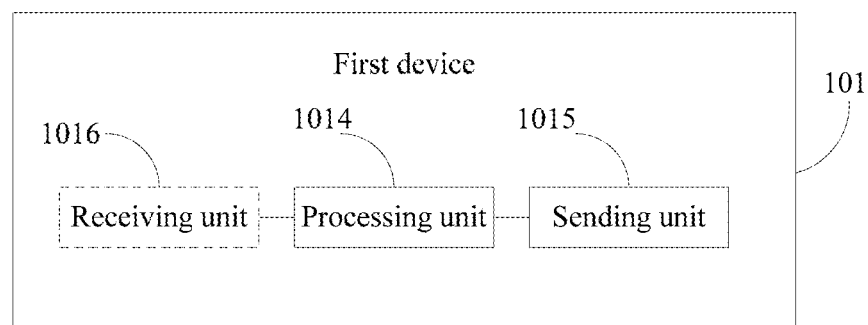
FIG. 25 is a schematic structural diagram of another first device according to an embodiment of the present invention.

An example is provided. Optionally, as shown in FIG. 25, the first device further includes a receiving unit 1016, configured to: before the processing unit 1014 determines, based on a service requirement and/or a message type of a V2X service, to use the RA preamble sequence and/or the radio resource of the RA preamble sequence, receive the RA preamble sequence and/or the radio resource of the RA preamble sequence from the second device.

An example is provided. The processing unit 1014 is further configured to: when there is a V2X service, or the processing unit 1014 finds, through calculation, that a scheduling request SR does not meet a service requirement of a V2X service, determine, based on the service requirement and/or the message type of the service, to use the random access RA preamble sequence and/or the radio resource of the RA preamble sequence.

An example is provided. The RA preamble sequence includes a specified preamble sequence separated from an existing RA preamble sequence or a preamble sequence obtained by extending an existing RA preamble sequence.

An example is provided. The service requirement of the service includes the service requirement of the V2X service.

It should be noted that the processing unit 1014 may be an independently disposed processor, or may be integrated into a processor of the first device for implementation, or may be stored in a memory of the first device in a form of program code to be invoked by a processor of the first device to perform the foregoing functions of the processing unit. The processor herein may be a central processing unit (CPU), an application-specific integrated circuit (ASIC), or one or more integrated circuits configured to implement this embodiment of the present invention.

The first device in this embodiment of the present invention may be configured to perform the method procedure shown in FIG. 18. Therefore, for technical effects that can be obtained by the first device, refer to the method embodiment shown in FIG. 18, and details are not repeated in this embodiment of the present invention.

Figure 26:
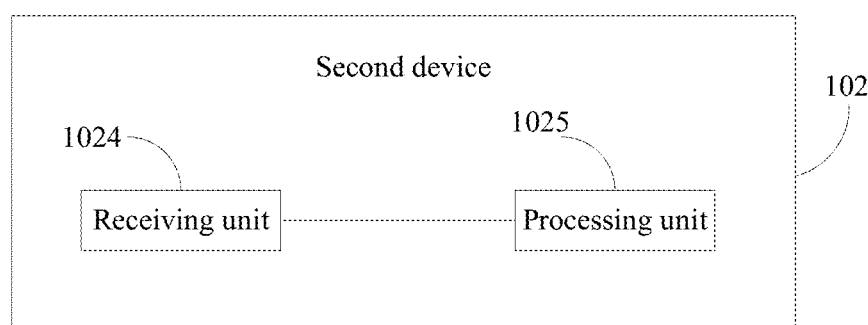
FIG. 26 is a schematic structural diagram of a second device according to an embodiment of the present invention.

The present invention provides a second device. The second device may be the second device 102 in FIG. 4 and is applied to the scheduling method in FIG. 18 and vehicle-to-everything V2X communication. As shown in FIG. 26, the second device includes:

a receiving unit 1024, configured to receive random access from a first device; and a processing unit 1025, configured to allocate a scheduling resource to the first device based on an RA preamble sequence used when the first device performs random access and/or a radio resource of the RA preamble sequence, where the RA preamble sequence and/or the radio resource of the RA preamble sequence are/is determined by the first device based on a service requirement and/or a message type of a service, and are/is used to indicate a service requirement and/or a message type of data of the first device.

The second device in this embodiment of the present invention may be configured to perform the method procedure shown in FIG. 18. Therefore, for technical effects that can be obtained by the second device, refer to the method embodiment shown in FIG. 18, and details are not repeated in this embodiment of the present invention.

An example is provided. The service requirement further includes a time requirement and/or a rate requirement.

Figure 27:
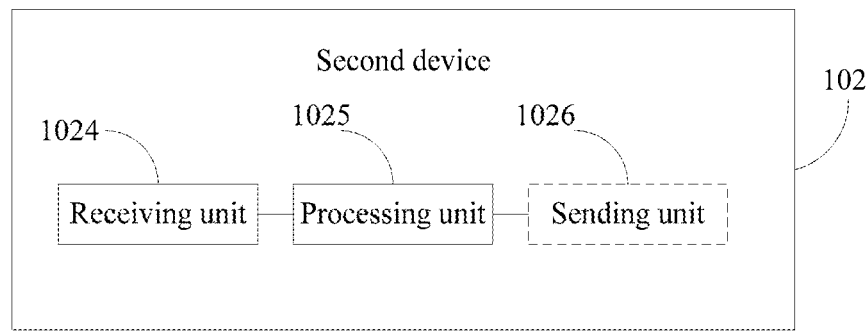
FIG. 27 is a schematic structural diagram of another second device according to an embodiment of the present invention.

An example is provided. As shown in FIG. 27, the second device further includes a sending unit 1026, configured to: before the receiving unit 1024 receives random access from the first device, send the RA preamble sequence and/or the radio resource of the RA preamble sequence to the first device.

An example is provided. The receiving unit 1024 is further configured to: when there is a V2X service, or the first device finds, through calculation, that a scheduling request SR does not meet a service requirement of the V2X service, receive random access from the first device.

An example is provided. The RA preamble sequence includes a specified preamble sequence separated from an existing RA preamble sequence or a preamble sequence obtained by extending an existing RA preamble sequence.

An example is provided. The service requirement of the service includes the service requirement of the V2X service.

It should be noted that the processing unit 1025 may be an independently disposed processor, or may be integrated into a processor of the second device for implementation, or may be stored in a memory of the second device in a form of program code to be invoked by a processor of the second device to perform the foregoing functions of the processing unit. The processor herein may be a central processing unit (CPU), an application-specific integrated circuit (ASIC), or one or more integrated circuits configured to implement this embodiment of the present invention.

The second device in this embodiment of the present invention may be configured to perform the method procedure shown in FIG. 18. Therefore, for technical effects that can be obtained by the second device, refer to the method embodiment shown in FIG. 18, and details are not repeated in this embodiment of the present invention.

Figure 28:
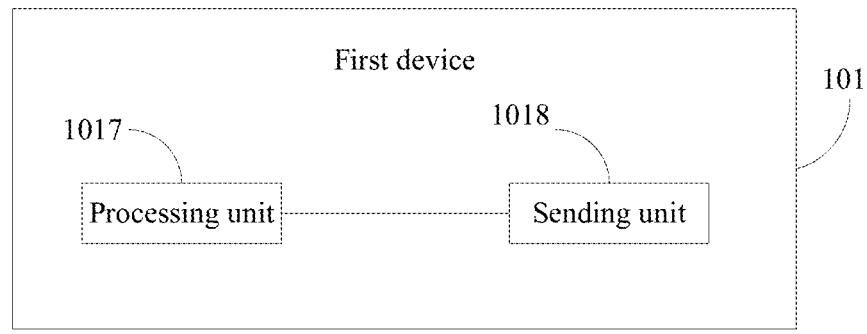
FIG. 28 is a schematic structural diagram of a first device according to an embodiment of the present invention.

The present invention provides a first device. The first device may be the first device 101 in FIG. 4 and is applied to the scheduling method in FIG. 19 and vehicle-to-everything V2X communication. As shown in FIG. 28, the first device includes:

a processing unit 1017, configured to measure a radio resource and/or a radio signal to generate a measurement result, where the measurement result is used to instruct a second device to determine a data sending range of the first device and select a proper cell based on the sending range to send a first message; and a sending unit 1018, configured to send the measurement result to the second device.

The first device in this embodiment of the present invention may be configured to perform the method procedure shown in FIG. 19. Therefore, for technical effects that can be obtained by the first device, refer to the method embodiment shown in FIG. 19, and details are not repeated in this embodiment of the present invention.

An example is provided. The measurement result includes a measurement result of a specified cell, or a measurement result of a specified cell that meets the following condition: the measurement result is lower than a first threshold and/or lower than a measurement result of the first threshold and a first offset value.

An example is provided. The sending unit 1018 is specifically configured to perform one of the following operations:

sending the measurement result of the specified cell to the second device before a V2X service is started; or sending the measurement result of the specified cell to the second device after a V2X service is started.

An example is provided. The measurement result includes mobility information of the first device, and the mobility information includes cell-related time information and at least one of the following cell information: a cell that the first device has passed through, is passing through, or is to pass through.

An example is provided. The sending unit 1018 is specifically configured to send the mobility information of the first device in a UU-sidelink conversion process. A UU is a link between a terminal and a network, and a sidelink is a device-to-device link.

An example is provided. The sending unit 1018 is specifically configured to send the measurement result and/or location information of the first device to the second device.

An example is provided. The sending unit 1018 is specifically configured to: when any one of the following conditions is met, send the measurement result and/or the location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

An example is provided. The sending unit 1018 is specifically configured to periodically send the measurement result and/or the location information of the first device to the second device.

An example is provided. The mobility information further includes V2X message type information and/or V2X message sending distance information of the first device.

An example is provided. The sending unit 1018 is specifically configured to send the V2X message type information and/or the V2X message sending distance information of the first device to the second device by using one or a combination of a radio resource control RRC layer, a Medium Access Control MAC layer, and a physical PHY layer.

An example is provided. The first message is one of the following messages: a V2X message, a wearable service message, a cellular-based Narrowband Internet of Things NB-IoT service message, and a broadband service message.

The first device in this embodiment of the present invention may be configured to perform the method procedure shown in FIG. 19. Therefore, for technical effects that can be obtained by the first device, refer to the method embodiment shown in FIG. 19, and details are not repeated in this embodiment of the present invention.

Figure 29:
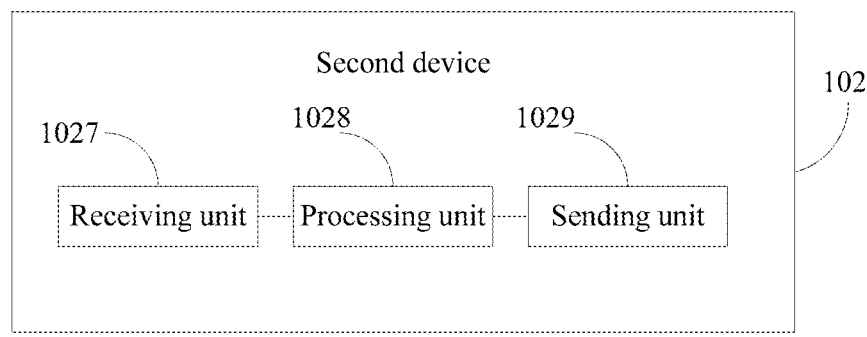
FIG. 29 is a schematic structural diagram of a second device according to an embodiment of the present invention.

The present invention provides a second device. The second device may be the first device 102 in FIG. 4 and is applied to the scheduling method in FIG. 19 and vehicle-to-everything V2X communication. As shown in FIG. 29, the second device includes:

a receiving unit 1027, configured to receive a measurement result from a first device, where the measurement result is generated by the first device based on a measured radio resource and/or a measured radio signal;

a processing unit 1028, configured to determine a data sending range of the first device based on the measurement result; and a sending unit 1029, configured to select a proper cell based on the sending range to send a first message.

The second device in this embodiment of the present invention may be configured to perform the method procedure shown in FIG. 19. Therefore, for technical effects that can be obtained by the second device, refer to the method embodiment shown in FIG. 19, and details are not repeated in this embodiment of the present invention.

An example is provided. The measurement result includes a measurement result of a specified cell, or a measurement result of a specified cell that meets the following condition:

the measurement result is lower than a first threshold and/or lower than a sum of the first threshold and a first offset value.

An example is provided. The receiving unit 1027 is specifically configured to perform one of the following operations:

receiving the measurement result of the specified cell from the first device before a V2X service is started; or receiving the measurement result of the specified cell from the first device after a V2X service is started.

An example is provided. The measurement result includes mobility information of the first device, and the mobility information includes cell-related time information and at least one of the following cell information: a cell that the first device has passed through, is passing through, or is to pass through.

An example is provided. The receiving unit 1027 is specifically configured to receive the mobility information of the first device in a UU-sidelink conversion process. A UU is a link between a terminal and a network, and a sidelink is a device-to-device link.

An example is provided. The receiving unit 1027 is specifically configured to receive the measurement result and/or location information of the first device from the first device.

An example is provided. The receiving unit 1027 is specifically configured to: when any one of the following conditions is met, receive the measurement result and/or the location information of the first device from the first device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

An example is provided. The receiving unit 1027 is specifically configured to periodically receive the measurement result and/or the location information of the first device from the first device.

An example is provided. The mobility information further includes V2X message type information and/or V2X message sending distance information of the first device.

An example is provided. The receiving unit 1027 is specifically configured to receive the V2X message type information and/or the V2X message sending distance information of the first device from the first device by using one or a combination of a radio resource control RRC layer, a Medium Access Control MAC layer, and a physical PHY layer.

An example is provided. The first message is one of the following messages: a V2X message, a wearable service message, a cellular-based Narrowband Internet of Things NB-IoT service message, and a broadband service message.

It should be noted that the processing unit 1028 may be an independently disposed processor, or may be integrated into a processor of the second device for implementation, or may be stored in a memory of the second device in a form of program code to be invoked by a processor of the second device to perform the foregoing functions of the processing unit. The processor herein may be a central processing unit (CPU), an application-specific integrated circuit (ASIC), or one or more integrated circuits configured to implement this embodiment of the present invention.

The second device in this embodiment of the present invention may be configured to perform the method procedure shown in FIG. 19. Therefore, for technical effects that can be obtained by the second device, refer to the method embodiment shown in FIG. 19, and details are not repeated in this embodiment of the present invention.

Figure 30:
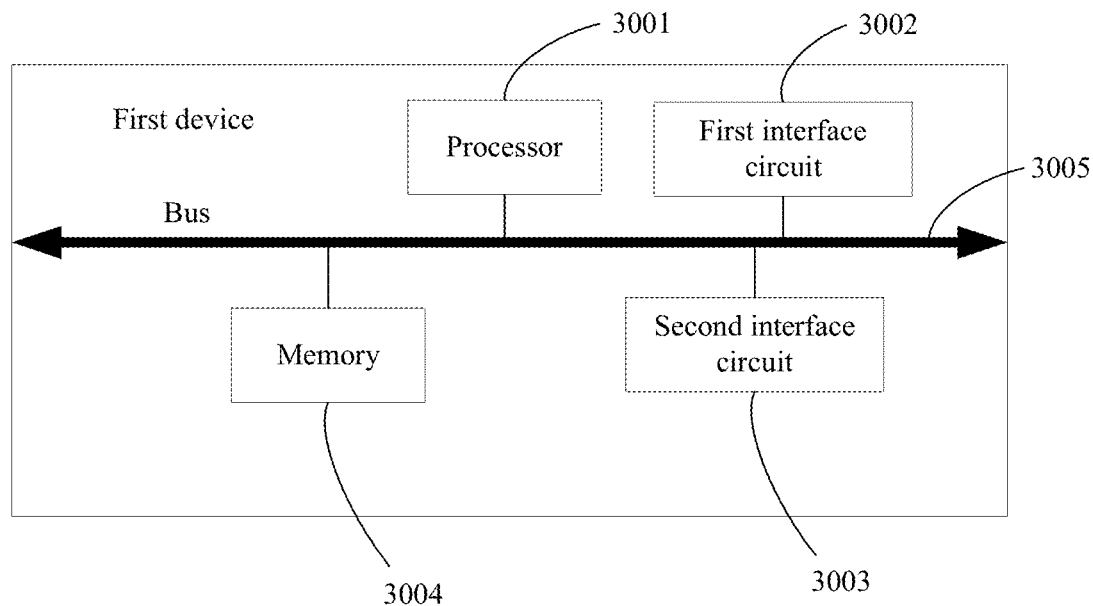
FIG. 30 is a schematic structural diagram of a first device according to an embodiment of the present invention.

The present invention provides a first device. The first device may be the first device 101 in FIG. 4 and is applied to the scheduling methods in FIG. 5, FIG. 15, and FIG. 17. As shown in FIG. 30, the first device includes a processor 3001, a first interface circuit 3002, a second interface circuit 3003, a memory 3004, and a bus 3005. The processor 3001, the first interface circuit 3002, the second interface circuit 3003, and the memory 3004 are connected and implement mutual communication, by using the bus 3005. The processor 3001 is configured to execute program code in the memory 3004 to control the first interface circuit 3002 and the second interface circuit 3003 to perform the following operations:

receiving, by the first interface circuit 3002, semi-persistent scheduling SPS configuration information from a second device, where the SPS configuration information is used to indicate an SPS resource configuration used by the second device;

receiving, by the first interface circuit 3002, SPS activation information from the second device, where the SPS activation information is used to indicate an activated SPS resource, and the activated SPS resource is one or more SPS resources in the SPS resource configuration; and sending, by the second interface circuit 3003, SPS instruction information to the second device, where the SPS instruction information is used to instruct to use or not to use a scheduling resource of the activated SPS resource.

The first device in this embodiment of the present invention may be configured to perform the method procedures shown in FIG. 5, FIG. 15, and FIG. 17. Therefore, for technical effects that can be obtained by the first device, refer to the method embodiments shown in FIG. 5, FIG. 15, and FIG. 17, and details are not repeated in this embodiment of the present invention.

An example is provided. The SPS resource configuration includes at least one or a combination of the following:

an SPS scheduling interval with m available scheduling resources; or

M SPS scheduling intervals.

An example is provided. The processor 3001 is configured to: when the SPS resource configuration is the SPS scheduling interval with the m available scheduling resources, perform at least one or a combination of the following operations:

using a UL grant resource, which is determined in a current subframe based on DCI scrambled by using the SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using the SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

An example is provided. When the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

An example is provided. That the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

An example is provided. The time window is sent by the second interface circuit 3003 to the second device; or the time window is sent by the second device to the first interface circuit 3002.

An example is provided. The processor 3001 is further configured to determine SPS release information, where the SPS release information is used to instruct to release some or all scheduling resources of the activated SPS resource.

The second interface circuit 3003 is further configured to send the SPS release information to the second device.

An example is provided. That the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI is used to instruct to release one or more SPS scheduling intervals of the activated SPS resource.

An example is provided. The first interface circuit 3002 is further configured to receive SPS release information from the second device, where the SPS release information is used to instruct to release some or all scheduling resources of the activated SPS resource.

An example is provided. When the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

An example is provided. The SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

An example is provided. The SPS is used between a network and a terminal or between terminals.

It should be noted that the processor 3001 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3004 may be one storage apparatus, or may be a joint name of a plurality of storage elements, and is configured to store executable program code, or a parameter, data, and the like that are required for running of a management device of an access network. In addition, the memory 3004 may include a random access memory (RAM), or may include a non-volatile memory (NVRAM), for example, a magnetic disk memory or a flash memory (Flash).

The bus 3005 may be an industry standard architecture (ISA) bus, a peripheral component interconnect (PCI) bus, an extended industry standard architecture (EISA) bus, or the like. The bus 3005 may be classified into an address bus, a data bus, a control bus, and the like. For ease of representation, the bus 3005 is represented by using only one bold line in FIG. 30, which, however, does not mean that there is only one bus or one type of bus.

The processor 3001 is configured to execute program code in the memory to execute, together with the first interface circuit 3002 and the second interface circuit 3003, the method provided in the embodiment shown in FIG. 5, FIG. 15, or FIG. 17.

Specifically, the processor 3001 is configured to execute the program in the memory to perform the functions of the processing unit of the first device in the embodiment shown in FIG. 5, FIG. 15, or FIG. 17.

The first interface circuit 3002 is configured to perform the functions of the receiving unit of the first device in the embodiment shown in FIG. 5, FIG. 15, or FIG. 17.

The second interface circuit 3003 is configured to perform the functions of the sending unit of the first device in the embodiment shown in FIG. 5, FIG. 15, or FIG. 17.

The first device in this embodiment of the present invention may be configured to perform the method procedures shown in FIG. 5, FIG. 15, and FIG. 17. Therefore, for technical effects that can be obtained by the first device, refer to the method embodiments shown in FIG. 5, FIG. 15, and FIG. 17, and details are not repeated in this embodiment of the present invention.

Figure 31:
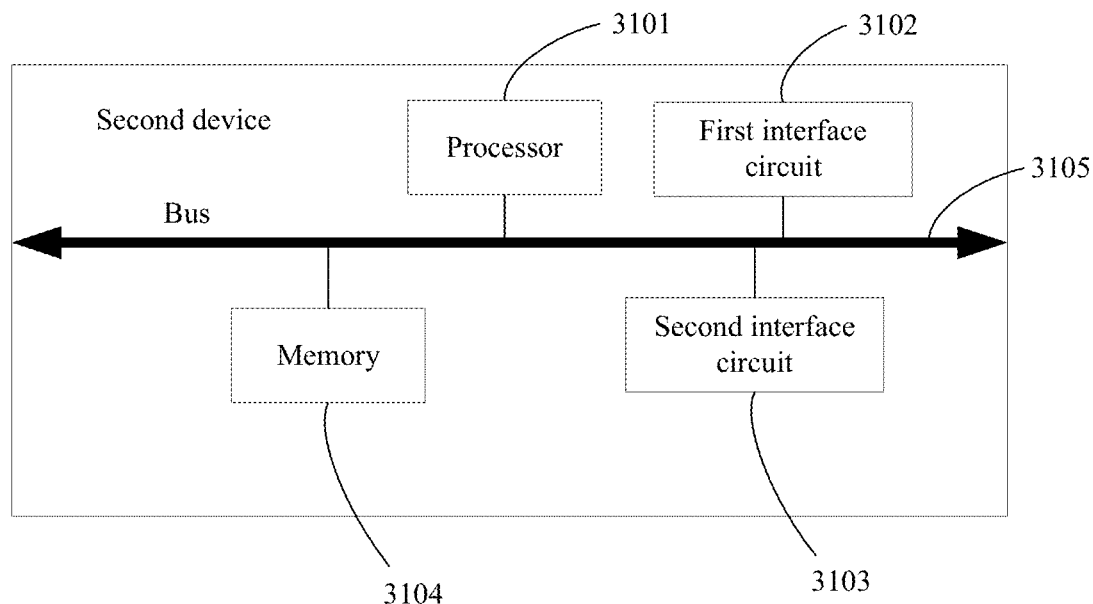
FIG. 31 is a schematic structural diagram of a second device according to an embodiment of the present invention.

The present invention provides a second device. The second device may be the second device 102 in FIG. 4 and is applied to the scheduling methods in FIG. 5, FIG. 15, and FIG. 17. As shown in FIG. 31, the second device includes a processor 3101, a first interface circuit 3102, a second interface circuit 3103, a memory 3104, and a bus 3105. The processor, the first interface circuit 3102, the second interface circuit 3103, and the memory 3104 are connected and implement mutual communication, by using the bus 3105. The processor 3101 is configured to execute program code in the memory 3104 to control the first interface circuit 3001 and the second interface circuit 3003 to perform the following operations:

sending, by the first interface circuit 3102, semi-persistent scheduling SPS configuration information to a first device, where the SPS configuration information is used to indicate an SPS resource configuration used by the second device;

sending, by the first interface circuit 3102, SPS activation information to the first device, where the SPS activation information is used to indicate an activated SPS resource, and the activated SPS resource is one or more SPS resources in the SPS resource configuration; and receiving, by the second interface circuit 3103, SPS instruction information from the first device, where the SPS instruction information is used to instruct to use or not to use a scheduling resource of the activated SPS resource.

The second device in this embodiment of the present invention may be configured to perform the method procedures shown in FIG. 5, FIG. 15, and FIG. 17. Therefore, for technical effects that can be obtained by the second device, refer to the method embodiments shown in FIG. 5, FIG. 15, and FIG. 17, and details are not repeated in this embodiment of the present invention.

An example is provided. The SPS resource configuration includes at least one or a combination of the following:

an SPS scheduling interval with m available scheduling resources; or

M SPS scheduling intervals.

An example is provided. The processor 3101 is configured to: when the SPS resource configuration is the SPS scheduling interval with the m available scheduling resources, perform at least one or a combination of the following operations:

using a UL grant resource, which is determined in a current subframe based on DCI scrambled by using an SPS-CRNTI, as a resource occupied by the m available scheduling resources; or using a UL grant resource, which is determined in a subframe before a subframe corresponding to an $i^{th}$ available scheduling resource in the SPS interval or in a current subframe based on DCI scrambled by using the SPS-CRNTI, as a resource occupied by the $i^{th}$ available scheduling resource, where the $i^{th}$ available scheduling resource is one of the m available scheduling resources; or using DCI scrambled by using an SPS-CRNTI, to activate one or more of the m available scheduling resources.

An example is provided. When the SPS resource configuration is the M SPS scheduling intervals, that the SPS activation information is used to indicate an activated SPS resource includes at least one or a combination of the following:

M bits in a bitmap bitmap in DCI are used to instruct to activate and/or deactivate one or more of the M SPS scheduling intervals; or a time-frequency resource of the SPS activation information is used to instruct to activate and/or deactivate one of the M SPS scheduling intervals; or content of the SPS activation information is used to instruct to activate and/or deactivate one or more of the M SPS scheduling intervals.

An example is provided. That the SPS instruction information is used to instruct to use or not to use a scheduling resource of the activated SPS resource includes one of the following:

when the SPS resource configuration is the SPS scheduling interval with the m available scheduling resources, the SPS instruction information is used to instruct to use or not to use consecutive scheduling resources of the m available scheduling resources within a time window; or when the SPS resource configuration is the M SPS scheduling intervals, the SPS instruction information is used to instruct to use or not to use consecutive scheduling resources in N SPS scheduling intervals of the M SPS scheduling intervals within a time window, where N≤M.

An example is provided. The time window is sent by the first interface circuit 3102 to the second device; or the time window is sent by the second device to the second interface circuit 3103.

An example is provided. The second interface circuit 3103 is further configured to receive SPS release information from the first device, where the SPS release information is used to instruct to release some or all scheduling resources of the activated SPS resource.

An example is provided. That the SPS release information is used to instruct to release some or all SPS resources of the activated SPS resource includes at least one or a combination of the following:

when the SPS resource configuration is the SPS scheduling interval with the m available scheduling resources, the SPS release information sent in a subframe or a short subframe before any scheduling resource of the m available scheduling resources in the SPS scheduling interval is used to instruct to release the any scheduling resource; or when the SPS resource configuration is the M SPS scheduling intervals, uplink control information UCI instructs to release one or more SPS scheduling intervals of the activated SPS resource.

An example is provided. The processor 3101 is further configured to determine SPS release information, where the SPS release information is used to instruct to release some or all scheduling resources of the activated SPS resource.

The first interface circuit 3102 is further configured to send the SPS release information to the first device.

An example is provided. When the SPS resource configuration is the M SPS scheduling intervals, that the SPS release information is used to instruct to release some or all scheduling resources of the activated SPS resource includes one of the following:

a hybrid automatic repeat request HARQ identifier in the DCI is used to instruct to release one SPS resource of the activated SPS resource; or the SPS release information sent on any scheduling resource of the activated SPS resource is used to instruct to release all SPS scheduling resources corresponding to the any scheduling resource.

An example is provided. The SPS resource configuration includes a downlink SPS resource, and the activated SPS resource or a deactivated SPS resource includes the downlink SPS resource; or the SPS resource configuration includes an uplink SPS resource, and the activated SPS resource or a deactivated SPS resource includes the uplink SPS resource.

An example is provided. The SPS is used between a network and a terminal or between terminals.

It should be noted that the processor 3101 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3104 may be one storage apparatus, or may be a joint name of a plurality of storage elements, and is configured to store executable program code, or a parameter, data, and the like that are required for running of a management device of an access network. In addition, the memory 3104 may include a random access memory (RAM), or may include a non-volatile memory (NVRAM), for example, a magnetic disk memory or a flash memory (Flash).

The bus 3105 may be an industry standard architecture (ISA) bus, a peripheral component interconnect (PCI) bus, an extended industry standard architecture (EISA) bus, or the like. The bus 3105 may be classified into an address bus, a data bus, a control bus, and the like. For ease of representation, the bus 3105 is represented by using only one bold line in FIG. 31, which, however, does not mean that there is only one bus or one type of bus.

The processor 3101 is configured to execute program code in the memory to execute, together with the first interface circuit 3102 and the second interface circuit 3103, the method provided in the embodiment shown in FIG. 5, FIG. 15, or FIG. 17.

Specifically, the processor 3101 is configured to execute the program code in the memory to perform the functions of the processing unit of the second device in the embodiment shown in FIG. 5, FIG. 15, or FIG. 17.

The first interface circuit 3102 is configured to perform the functions of the sending unit of the second device in the embodiment shown in FIG. 5, FIG. 15, or FIG. 17.

The second interface circuit 3103 is configured to perform the functions of the receiving unit of the second device in the embodiment shown in FIG. 5, FIG. 15, or FIG. 17.

The second device in this embodiment of the present invention may be configured to perform the method procedures shown in FIG. 5, FIG. 15, and FIG. 17. Therefore, for technical effects that can be obtained by the second device, refer to the method embodiments shown in FIG. 5, FIG. 15, and FIG. 17, and details are not repeated in this embodiment of the present invention.

Figure 32:
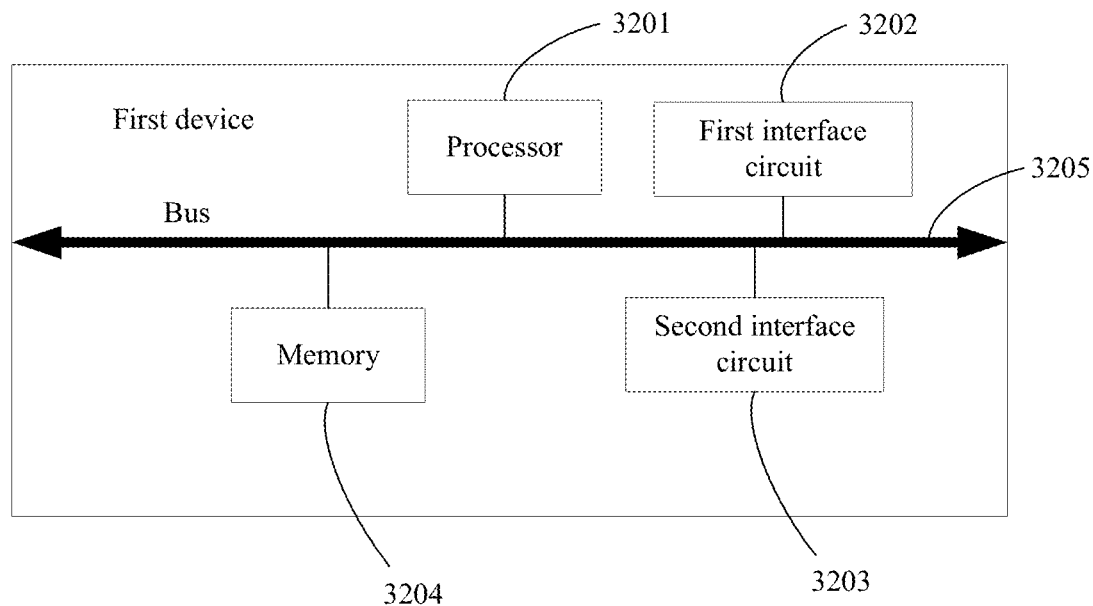
FIG. 32 is a schematic structural diagram of a first device according to an embodiment of the present invention.

The present invention provides a first device. The first device may be the first device 101 in FIG. 4 and is applied to the scheduling method in FIG. 18 and vehicle-to-everything V2X communication. As shown in FIG. 32, the first device includes a processor 3201, a first interface circuit 3202, a second interface circuit 3203, a memory 3204, and a bus 3205. The processor 3201, the first interface circuit 3202, the second interface circuit 3203, and the memory 3204 are connected and implement mutual communication, by using the bus 3205. The processor 3201 is configured to execute program code in the memory 3204 to control the first interface circuit 3202 and the second interface circuit 3203 to perform the following operations:

determining, by the processor 3201 based on a service requirement and/or a message type of a service, to use a random access RA preamble sequence and/or a radio resource of the RA preamble sequence, where the RA preamble sequence and/or the radio resource of the RA preamble sequence are/is used to indicate a service requirement and/or a message type of data of the first device; and initiating, by the first interface circuit 3202, random access to a second device based on the determined RA preamble sequence and/or the radio resource of the RA preamble sequence.

The first device in this embodiment of the present invention may be configured to perform the method procedure shown in FIG. 18. Therefore, for technical effects that can be obtained by the first device, refer to the method embodiment shown in FIG. 18, and details are not repeated in this embodiment of the present invention.

An example is provided. The service requirement further includes a time requirement and/or a rate requirement.

An example is provided. The second interface circuit 3203 is configured to: before the processor 3201 determines, based on a service requirement and/or a message type of a V2X service, to use an RA preamble sequence and/or a radio resource of the RA preamble sequence, receive the RA preamble sequence and/or the radio resource of the RA preamble sequence from the second device.

An example is provided. The processor 3201 is further configured to: when there is a V2X service, or the processor 3201 finds, through calculation, that a scheduling request SR does not meet a service requirement of a V2X service, determine, based on the service requirement and/or the message type of the service, to use the random access RA preamble sequence and/or the radio resource of the RA preamble sequence.

An example is provided. The RA preamble sequence includes a specified preamble sequence separated from an existing RA preamble sequence or a preamble sequence obtained by extending an existing RA preamble sequence.

An example is provided. The service requirement of the service includes the service requirement of the V2X service.

It should be noted that the processor 3201 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3204 may be one storage apparatus, or may be a joint name of a plurality of storage elements, and is configured to store executable program code, or a parameter, data, and the like that are required for running of a management device of an access network. In addition, the memory 3204 may include a random access memory (RAM), or may include a non-volatile memory (NVRAM), for example, a magnetic disk memory or a flash memory (Flash).

The bus 3205 may be an industry standard architecture (ISA) bus, a peripheral component interconnect (PCI) bus, an extended industry standard architecture (EISA) bus, or the like. The bus 3205 may be classified into an address bus, a data bus, a control bus, and the like. For ease of representation, the bus 3205 is represented by using only one bold line in FIG. 32, which, however, does not mean that there is only one bus or one type of bus.

The processor 3201 is configured to execute program code in the memory to execute, together with the first interface circuit 3202 and the second interface circuit 3203, the method provided in the method embodiment shown in FIG. 18.

Specifically, the processor 3201 is configured to execute the program code in the memory to perform the functions of the processing unit of the first device in the embodiment shown in FIG. 18.

The first interface circuit 3202 is configured to perform the functions of the sending unit of the first device in the embodiment shown in FIG. 18.

The second interface circuit 3203 is configured to perform the functions of the receiving unit of the first device in the embodiment shown in FIG. 18.

The first device in this embodiment of the present invention may be configured to perform the method procedure shown in FIG. 18. Therefore, for technical effects that can be obtained by the first device, refer to the method embodiment shown in FIG. 18, and details are not repeated in this embodiment of the present invention.

Figure 33:
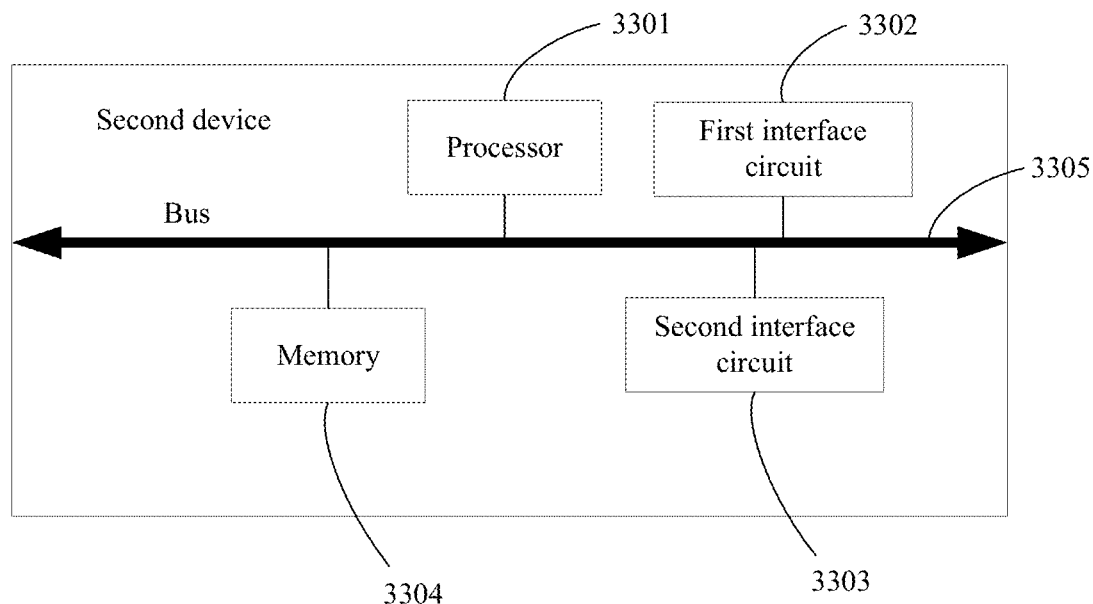
FIG. 33 is a schematic structural diagram of a second device according to an embodiment of the present invention.

The present invention provides a second device. The second device may be the second device 102 in FIG. 4 and is applied to the scheduling method in FIG. 18 and vehicle-to-everything V2X communication. As shown in FIG. 33, the second device includes a processor 3301, a first interface circuit 3302, a second interface circuit 3303, a memory 3304, and a bus 3305. The processor 3301, the first interface circuit 3302, the second interface circuit 3303, and the memory 3304 are connected and implement mutual communication, by using the bus 3305. The processor 3301 is configured to execute program code in the memory 3304 to control the first interface circuit 3302 and the second interface circuit 3303 to perform the following operations:

receiving, by the first interface circuit 3302, random access from a first device; and allocating, by the processor 3301, a scheduling resource to the first device based on an RA preamble sequence used when the first device performs random access and/or a radio resource of the RA preamble sequence, where the RA preamble sequence and/or the radio resource of the RA preamble sequence are/is determined by the first device based on a service requirement and/or a message type of a service, and are/is used to indicate a service requirement and/or a message type of data of the first device.

The second device in this embodiment of the present invention may be configured to perform the method procedure shown in FIG. 18. Therefore, for technical effects that can be obtained by the second device, refer to the method embodiment shown in FIG. 18, and details are not repeated in this embodiment of the present invention.

An example is provided. The service requirement further includes a time requirement and/or a rate requirement.

An example is provided. The second interface circuit 3303 is configured to: before the first interface circuit 3302 receives random access from the first device, send the RA preamble sequence and/or the radio resource of the RA preamble sequence to the first device.

An example is provided. The first interface circuit 3302 is further configured to: when there is a V2X service, or the first device finds, through calculation, that a scheduling request SR does not meet a service requirement of the V2X service, receive random access from the first device.

An example is provided. The RA preamble sequence includes a specified preamble sequence separated from an existing RA preamble sequence or a preamble sequence obtained by extending an existing RA preamble sequence.

An example is provided. The service requirement of the service includes the service requirement of the V2X service.

It should be noted that the processor 3301 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3304 may be one storage apparatus, or may be a joint name of a plurality of storage elements, and is configured to store executable program code, or a parameter, data, and the like that are required for running of a management device of an access network. In addition, the memory 3304 may include a random access memory (RAM), or may include a non-volatile memory (NVRAM), for example, a magnetic disk memory or a flash memory (Flash).

The bus 3305 may be an industry standard architecture (ISA) bus, a peripheral component interconnect (PCI) bus, an extended industry standard architecture (EISA) bus, or the like. The bus 3305 may be classified into an address bus, a data bus, a control bus, and the like. For ease of representation, the bus 3305 is represented by using only one bold line in FIG. 33, which, however, does not mean that there is only one bus or one type of bus.

The processor 3301 is configured to execute program code in the memory to execute, together with the first interface circuit 3302 and the second interface circuit 3303, the method provided in the method embodiment shown in FIG. 18.

Specifically, the processor 3301 is configured to execute the program code in the memory to perform the functions of the processing unit of the second device in the embodiment shown in FIG. 18.

The first interface circuit 3302 is configured to perform the functions of the receiving unit of the second device in the embodiment shown in FIG. 18.

The second interface circuit 3303 is configured to perform the functions of the sending unit of the second device in the embodiment shown in FIG. 18.

The second device in this embodiment of the present invention may be configured to perform the method procedure shown in FIG. 18. Therefore, for technical effects that can be obtained by the second device, refer to the method embodiment shown in FIG. 18, and details are not repeated in this embodiment of the present invention.

Figure 34:
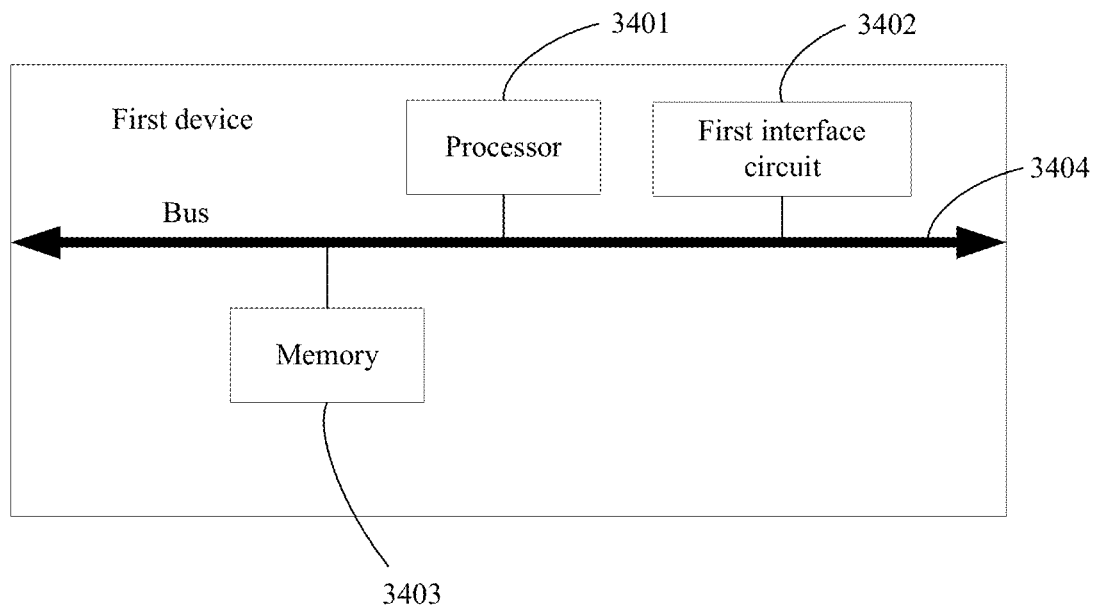
FIG. 34 is a schematic structural diagram of a first device according to an embodiment of the present invention.

The present invention provides a first device. The first device may be the first device 101 in FIG. 4 and is applied to the scheduling method in FIG. 19 and vehicle-to-everything V2X communication. As shown in FIG. 34, the first device includes a processor 3401, a first interface circuit 3402, a memory 3403, and a bus 3404. The processor 3401, the first interface circuit 3402, and the memory 3403 are connected and implement mutual communication, by using the bus 3404. The processor 3401 is configured to execute program code in the memory 3403 to control the first interface circuit 3402 to perform the following operations:

measuring, by the processor 3401, a radio resource and/or a radio signal to generate a measurement result, where the measurement result is used to instruct a second device to determine a data sending range of the first device and select a proper cell based on the sending range to send a first message; and sending, by the first interface circuit 3402, the measurement result to the second device.

The first device in this embodiment of the present invention may be configured to perform the method procedure shown in FIG. 19. Therefore, for technical effects that can be obtained by the first device, refer to the method embodiment shown in FIG. 19, and details are not repeated in this embodiment of the present invention.

An example is provided. The measurement result includes a measurement result of a specified cell, or a measurement result of a specified cell that meets the following condition: the measurement result is lower than a first threshold and/or lower than a measurement result of the first threshold and a first offset value.

An example is provided. The first interface circuit 3402 is specifically configured to perform one of the following operations:

sending the measurement result of the specified cell to the second device before a V2X service is started; or sending the measurement result of the specified cell to the second device after a V2X service is started.

An example is provided. The measurement result includes mobility information of the first device, and the mobility information includes cell-related time information and at least one of the following cell information: a cell that the first device has passed through, is passing through, or is to pass through.

An example is provided. The first interface circuit 3402 is specifically configured to send the mobility information of the first device in a UU-sidelink conversion process. A UU is a link between a terminal and a network, and a sidelink is a device-to-device link.

An example is provided. The first interface circuit 3402 is specifically configured to send the measurement result and/or location information of the first device to the second device.

An example is provided. The first interface circuit 3402 is specifically configured to: when any one of the following conditions is met, send the measurement result and/or the location information of the first device to the second device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

An example is provided. The first interface circuit 3402 is specifically configured to periodically send the measurement result and/or the location information of the first device to the second device.

An example is provided. The mobility information further includes V2X message type information and/or V2X message sending distance information of the first device.

An example is provided. The first interface circuit 3402 is specifically configured to send the V2X message type information and/or the V2X message sending distance information of the first device to the second device by using one or a combination of a radio resource control RRC layer, a Medium Access Control MAC layer, and a physical PHY layer.

An example is provided. The first message is one of the following messages: a V2X message, a wearable service message, a cellular-based Narrowband Internet of Things NB-IoT service message, and a broadband service message.

It should be noted that the processor 3401 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3403 may be one storage apparatus, or may be a joint name of a plurality of storage elements, and is configured to store executable program code, or a parameter, data, and the like that are required for running of a management device of an access network. In addition, the memory 3403 may include a random access memory (RAM), or may include a non-volatile memory (NVRAM), for example, a magnetic disk memory or a flash memory (Flash).

The bus 3404 may be an industry standard architecture (ISA) bus, a peripheral component interconnect (PCI) bus, an extended industry standard architecture (EISA) bus, or the like. The bus 3404 may be classified into an address bus, a data bus, a control bus, and the like. For ease of representation, the bus 3404 is represented by using only one bold line in FIG. 34, which, however, does not mean that there is only one bus or one type of bus.

The processor 3401 is configured to execute program code in the memory to execute, together with the first interface circuit 3402, the method provided in the method embodiment shown in FIG. 19.

Specifically, the processor 3401 is configured to execute the program code in the memory to perform the functions of the processing unit of the first device in the embodiment shown in FIG. 19.

The first interface circuit 3402 is configured to perform the functions of the sending unit of the first device in the embodiment shown in FIG. 19.

The first device in this embodiment of the present invention may be configured to perform the method procedure shown in FIG. 19. Therefore, for technical effects that can be obtained by the first device, refer to the method embodiment shown in FIG. 19, and details are not repeated in this embodiment of the present invention.

Figure 35:
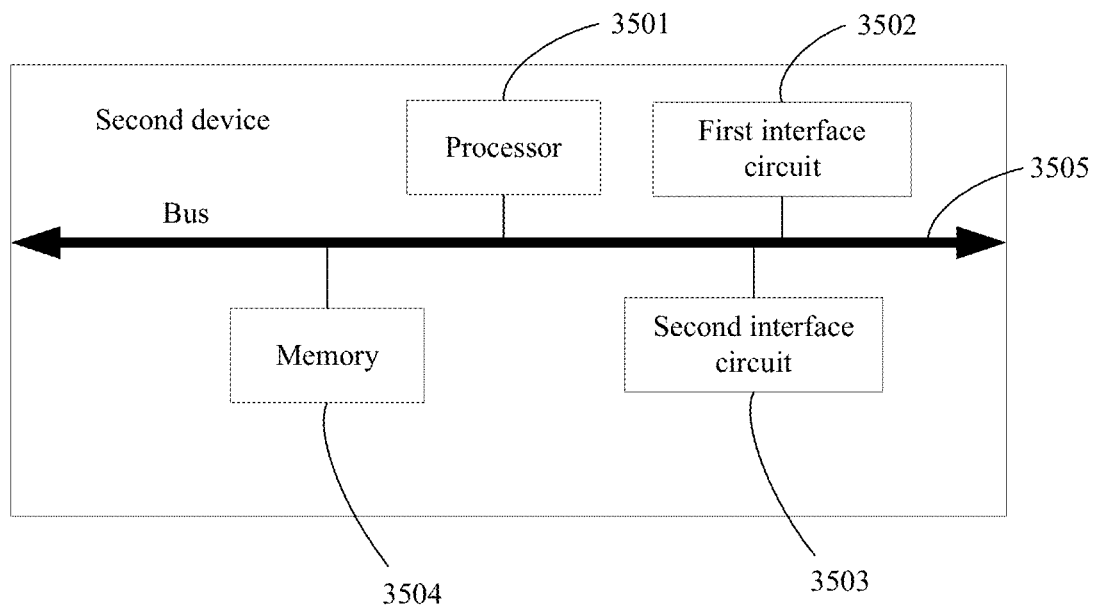
FIG. 35 is a schematic structural diagram of a second device according to an embodiment of the present invention.

The present invention provides a second device. The second device may be the first device 102 in FIG. 4 and is applied to the scheduling method in FIG. 19 and vehicleto-everything V2X communication. As shown in FIG. 35, the second device includes a processor 3501, a first interface circuit 3502, a second interface circuit 3503, a memory 3504, and a bus 3505. The processor 3501, the first interface circuit 3502, the second interface circuit 3503, and the memory 3504 are connected and implement mutual communication, by using the bus 3505. The processor 3501 is configured to execute program code in the memory 3504 to control the first interface circuit 3502 and the second interface circuit 3503 to perform the following operations:

receiving, by the first interface circuit 3502, a measurement result from a first device, where the measurement result is generated by the first device based on a measured radio resource and/or a measured radio signal;

determining, by the processor 3501, a data sending range of the first device based on the measurement result; and selecting, by the second interface circuit 3503, a proper cell based on the sending range to send a first message.

The second device in this embodiment of the present invention may be configured to perform the method procedure shown in FIG. 19. Therefore, for technical effects that can be obtained by the second device, refer to the method embodiment shown in FIG. 19, and details are not repeated in this embodiment of the present invention.

An example is provided. The measurement result includes a measurement result of a specified cell, or a measurement result of a specified cell that meets the following condition: the measurement result is lower than a first threshold and/or lower than a sum of the first threshold and a first offset value.

An example is provided. The first interface circuit 3502 is specifically configured to perform one of the following operations:

receiving the measurement result of the specified cell from the first device before a V2X service is started; or receiving the measurement result of the specified cell from the first device after a V2X service is started.

An example is provided. The measurement result includes mobility information of the first device, and the mobility information includes cell-related time information and at least one of the following cell information: a cell that the first device has passed through, is passing through, or is to pass through.

An example is provided. The first interface circuit 3502 is specifically configured to send the mobility information of the first device in a UU-sidelink conversion process. A UU is a link between a terminal and a network, and a sidelink is a device-to-device link.

An example is provided. The first interface circuit 3502 is specifically configured to receive the measurement result and/or location information of the first device from the first device.

An example is provided. The first interface circuit 3502 is specifically configured to: when any one of the following conditions is met, receive the measurement result and/or the location information of the first device from the first device:

a speed of the first device meets at least one of the following conditions: the speed is higher than a second threshold; the speed is higher than an offset value of the second threshold; the speed is lower than a third threshold; the speed is lower than an offset value of the third threshold; and the speed is within a predetermined range; or the first device passes through a geographic location preconfigured by a network side; or signal quality of the first device meets a predetermined condition; or a data rate is lower than a fourth threshold or lower than an offset value of a fourth threshold; or interference is higher than a fifth threshold, or interference is higher than an offset value of a fifth threshold; or the first device passes through a geographic location change location configured through geographic location-based resource allocation; or the first device passes through a geographic location change location configured through geographic location-based resource allocation, and a signal meets a constraint, where the constraint met by the signal includes one or a combination of the following: a measurement result of the signal is lower than a first threshold; the measurement result of the signal is lower than the first threshold and a first offset value; the measurement result of the signal is higher than the first threshold; and the measurement result of the signal is higher than the first threshold and the first offset value.

An example is provided. The first interface circuit 3502 is specifically configured to periodically receive the measurement result and/or the location information of the first device from the first device.

An example is provided. The mobility information further includes V2X message type information and/or V2X message sending distance information of the first device.

An example is provided. The first interface circuit 3502 is specifically configured to receive the V2X message type information and/or the V2X message sending distance information of the first device from the first device by using one or a combination of a radio resource control RRC layer, a Medium Access Control MAC layer, and a physical PHY layer.

An example is provided. The first message is one of the following messages: a V2X message, a wearable service message, a cellular-based Narrowband Internet of Things NB-IoT service message, and a broadband service message.

It should be noted that the processor 3501 herein may be one processor, or may be a joint name of a plurality of processing elements. For example, the processor may be a central processing unit CPU, may be an application-specific integrated circuit ASIC, or may be one or more integrated circuits configured to implement this embodiment of the present invention, for example, one or more microprocessors (DSP), or one or more field programmable gate arrays (FPGA).

The memory 3504 may be one storage apparatus, or may be a joint name of a plurality of storage elements, and is configured to store executable program code, or a parameter, data, and the like that are required for running of a management device of an access network. In addition, the memory 3504 may include a random access memory (RAM), or may include a non-volatile memory (NVRAM), for example, a magnetic disk memory or a flash memory (Flash).

The bus 3505 may be an industry standard architecture (ISA) bus, a peripheral component interconnect (PCI) bus, an extended industry standard architecture (EISA) bus, or the like. The bus 3505 may be classified into an address bus, a data bus, a control bus, and the like. For ease of representation, the bus 3505 is represented by using only one bold line in FIG. 35, which, however, does not mean that there is only one bus or one type of bus.

The processor 3501 is configured to execute program code in the memory to execute, together with the first interface circuit 3502 and the second interface circuit 3503, the method provided in the method embodiment shown in FIG. 19.

Specifically, the first interface circuit 3502 is configured to perform the functions of the receiving unit of the second device in the embodiment shown in FIG. 19.

The second interface circuit 3503 is configured to perform the functions of the sending unit of the second device in the embodiment shown in FIG. 19.

The second device in this embodiment of the present invention may be configured to perform the method procedure shown in FIG. 19. Therefore, for technical effects that can be obtained by the second device, refer to the method embodiment shown in FIG. 19, and details are not repeated in this embodiment of the present invention.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, device, and method may be implemented in other manners. For example, the described device embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A scheduling method, wherein the method comprises:
   receiving, by a first device, semi-persistent scheduling (SPS) configuration information from a second device, wherein the SPS configuration information indicates an SPS resource configuration, the SPS resource configuration comprises one or more SPS resources;
   receiving, by the first device, SPS activation information from the second device, wherein the SPS activation information indicates an activated SPS resource, and the activated SPS resource is one or more SPS resources in the SPS resource configuration; and
   sending, by the first device, SPS instruction information to the second device, wherein the SPS instruction information instructs to use or not to use a SPS resource of the activated SPS resource, wherein the SPS resource configuration comprises M SPS scheduling intervals,
   wherein the time intervals of scheduling resources of different SPS scheduling intervals are different,
   receiving, by the first device, SPS release information from the second device, wherein the release information comprises a hybrid automatic repeat request (HARQ) identifier in a downlink control information (DCI), wherein the HARQ identifier in the DCI instructs the first device to release one SPS resource of the activated SPS resource;
   wherein the SPS is used between terminals.

2. The method according to claim 1, wherein the SPS resource configuration comprises a downlink SPS resource, and the activated SPS resource or a deactivated SPS resource comprises the downlink SPS resource; or the SPS resource configuration comprises an uplink SPS resource, and the activated SPS resource or a deactivated SPS resource comprises the uplink SPS resource.

3. A scheduling method, wherein the method comprises:
   sending, by a second device, semi-persistent scheduling (SPS) configuration information to a first device, wherein the SPS configuration information indicates an SPS resource configuration, the SPS resource configuration comprises one or more SPS resources;
   sending, by the second device, SPS activation information to the first device, wherein the SPS activation information indicates an activated SPS resource, and the activated SPS resource is one or more SPS resources in the SPS resource configuration;
   receiving, by the second device, SPS instruction information from the first device, wherein the SPS instruction information instructs to use or not to use a SPS resource of the activated SPS resource, wherein the SPS resource configuration comprises M SPS scheduling intervals, wherein the time intervals of scheduling resources of different SPS scheduling intervals are different, determining, by the second device, SPS release information, wherein the release information comprises a hybrid automatic repeat request (HARQ) identifier in a downlink control information (DCI), wherein the HARQ identifier in the DCI instructs the first device to release one SPS resource of the activated SPS resource; and sending, by the second device, the SPS release information to the first device;

wherein the SPS is used between terminals.

4. The method according to claim 3, wherein the SPS resource configuration comprises a downlink SPS resource, and the activated SPS resource or a deactivated SPS resource comprises the downlink SPS resource; or the SPS resource configuration comprises an uplink SPS resource, and the activated SPS resource or a deactivated SPS resource comprises the uplink SPS resource.

5. A first device, comprising a processor, a first interface circuit, a second interface circuit, a memory, and a bus, where the processor, the first interface circuit, the second interface circuit, and the memory are connected and implement mutual communication, by using the bus; and the processor is configured to execute program code in the memory to control the first interface circuit and the second interface circuit to perform the following operations:

receiving, by the first interface circuit, semi-persistent scheduling (SPS) configuration information from a second device, wherein the SPS configuration information indicates an SPS resource configuration, the SPS resource configuration comprises one or more SPS resources; and receiving, by the first interface circuit, SPS activation information from the second device, wherein the SPS activation information indicates an activated SPS resource, and the activated SPS resource is one or more SPS resources in the SPS resource configuration; and sending, by the second interface circuit, SPS instruction information to the second device, wherein the SPS instruction information instructs to use or not to use a SPS resource of the activated SPS resource, wherein the SPS resource configuration comprises M SPS scheduling intervals, wherein the time intervals of scheduling resources of different SPS scheduling intervals are different, wherein the first interface circuit is further configured to:
receive SPS release information from the second device, wherein the release information comprises a HARQ identifier in a DCI, wherein the HARQ identifier in the DCI instructs the first device to release one SPS resource of the activated SPS resource;

wherein the SPS is used between terminals.

6. The device according to claim 5, wherein the SPS resource configuration comprises a downlink SPS resource, and the activated SPS resource or a deactivated SPS resource comprises the downlink SPS resource; or the SPS resource configuration comprises an uplink SPS resource, and the activated SPS resource or a deactivated SPS resource comprises the uplink SPS resource.

7. A second device, comprising a processor, a first interface circuit, a second interface circuit, a memory, and a bus, where the processor, the first interface circuit, the second interface circuit, and the memory are connected and implement mutual communication, by using the bus; and the processor is configured to execute program code in the memory to control the first interface circuit and the second interface circuit to perform the following operations:

sending, by the first interface circuit, semi-persistent scheduling (SPS) configuration information to a first device, wherein the SPS configuration information indicates an SPS resource configuration, the SPS resource configuration comprises one or more SPS resources; and sending, by the first interface circuit, SPS activation information to the first device, wherein the SPS activation information indicates an activated SPS resource, and the activated SPS resource is one or more SPS resources in the SPS resource configuration; and receiving, by the second interface circuit, SPS instruction information from the first device, wherein the SPS instruction information instructs to use or not to use a SPS resource of the activated SPS resource, wherein the SPS resource configuration comprises M SPS scheduling intervals, wherein the time intervals of scheduling resources of different SPS scheduling intervals are different, wherein the processor is further configured to determine SPS release information, wherein the release information comprises a HARQ identifier in a DCI, wherein the HARQ identifier in the DCI instructs the first device to release one SPS resource of the activated SPS resource; and the first interface circuit is further configured to send the SPS release information to the first device;

wherein the SPS is used between terminals.

8. The device according to claim 7, wherein the SPS resource configuration comprises a downlink SPS resource, and the activated SPS resource or a deactivated SPS resource comprises the downlink SPS resource; or the SPS resource configuration comprises an uplink SPS resource, and the activated SPS resource or a deactivated SPS resource comprises the uplink SPS resource.

* * * * *